United States Patent
Junk

(10) Patent No.: US 8,567,588 B2
(45) Date of Patent: Oct. 29, 2013

(54) CONTAINER FILLING DEVICE

(75) Inventor: Martin Junk, Tholey (DE)

(73) Assignee: Hamba Filltec GmbH & Co. KG, Saarbruecken (DE)

( * ) Notice: Subject to any disclaimer, the term of this patent is extended or adjusted under 35 U.S.C. 154(b) by 0 days.

(21) Appl. No.: 13/517,794

(22) Filed: Jun. 14, 2012

(65) Prior Publication Data

US 2013/0146423 A1    Jun. 13, 2013

Related U.S. Application Data

(63) Continuation of application No. PCT/DE2009/001752, filed on Dec. 14, 2009.

(51) Int. Cl.
*B67C 7/00* (2006.01)
*B65B 43/52* (2006.01)
*B65G 35/08* (2006.01)

(52) U.S. Cl.
CPC . *B67C 7/00* (2013.01); *B65B 43/52* (2013.01); *B65G 35/08* (2013.01)
USPC .......... 198/465.1; 198/465.4; 198/468.2; 198/867.02; 141/168

(58) Field of Classification Search
USPC .......... 198/465.1, 465.3, 465.4, 468.2, 707, 198/710, 867.02; 141/165, 168
See application file for complete search history.

(56) References Cited

U.S. PATENT DOCUMENTS

| | | | | |
|---|---|---|---|---|
| 1,934,250 A | * | 11/1933 | Wynne et al. | 198/468.11 |
| 3,538,997 A | * | 11/1970 | Christine et al. | 198/867.12 |
| 6,398,538 B1 | * | 6/2002 | Padovani | 425/347 |
| 6,684,602 B2 | * | 2/2004 | Reinecke | 53/167 |
| 7,865,794 B2 | * | 1/2011 | Rajski et al. | 714/739 |
| 7,980,046 B2 | * | 7/2011 | Yousefpour et al. | 53/471 |
| 2003/0159753 A1 | * | 8/2003 | Maria | 141/165 |
| 2005/0097863 A1 | | 5/2005 | Taggart | |

FOREIGN PATENT DOCUMENTS

| | | |
|---|---|---|
| DE | 151457 C | 5/1904 |
| DE | 102006015842 A1 | 10/2007 |
| EP | 0286514 A1 | 10/1998 |
| EP | 1 495 997 A1 | 1/2005 |
| WO | WO 9830491 A1 | 7/1998 |
| WO | WO 0174691 A2 | 10/2001 |
| WO | WO 03051760 A1 | 6/2003 |

* cited by examiner

*Primary Examiner* — Mark A Deuble
(74) *Attorney, Agent, or Firm* — Von Rohrscheidt Patents

(57) ABSTRACT

A device for filling containers, in particular bottles and beakers with food products, in particular with low viscosity to pasty dairy and fat products, juices, waters and similar, comprising: an upper main element, a lower main element and lateral elements connecting the upper main element and the lower main element; and a plurality of support elements which are endlessly supported on rollers through the device past operating stations along the upper main element, the lateral element and the lower main element, wherein the support elements include receivers for containers which receivers are arranged in series transversal to a feed direction, wherein at least two support elements are arranged on a common frame and are run by the frame on rollers through the device in an endless manner.

9 Claims, 20 Drawing Sheets

CONTAINER FILLING DEVICE

RELATED APPLICATIONS

This application is a continuation of International application PCT/DE2009 001752 filed on Dec. 14, 2009.

FIELD OF THE INVENTION

The present invention relates to a device for filling containers, in particular bottles or beakers with food products, in particular liquid to paste-like dairy and fat products, juices, waters and similar, including an upper main element, a lower main element and lateral elements connecting the upper and the lower main element, and a plurality of support elements which are moved on rollers in an endless manner through the device past operating stations along the upper main element, the lateral element and the lower main element, wherein the support elements include receivers for containers arranged transversal to the feed direction in series.

BACKGROUND OF THE INVENTION

A device of this type is known e.g. from EP 1 134 182. It is an automated filling device which fills food products like for example dairy products into beakers or bottles. Thus, the support elements also designated as cell plates run through the device in an endless manner while being supported at a chain. Typically the operating stations which sterilize, dry, fill and close the containers are arranged along the upper main element. Through a first lateral element, the support elements then run into the lower main element arranged below the upper main element and are fed again to the upper main element through a second lateral element.

In most of the filling devices currently available in the market, the number of containers filled depends on the processing time of the slowest operating station of the chain. The chain feed is provided in a timed manner so that in a simple version, always those containers are treated which are jointly supported on a support element. However, there are also so-called double step devices in which the containers of two support elements are simultaneously treated at the operating stations.

The chain drive technique is tried and tested and has been used reliably for a long time though it has substantial disadvantages. Initially there is the basic problem that the chain elongates during operations. Consequently, the distance measured in feed direction between the support elements and thus also between the containers supported by the support elements increases over time. This is problematic since dosing sterilization agents, blowing in drying air, filling the containers and also closing at particular operating stations requires a comparatively exact positioning of the containers. Consequently, centering devices are required for chain operated devices.

The support elements are pulled through the device on sliding rails;

furthermore a support that is approximately central in feed direction is required above a certain size of the support elements. The mass inertias that have to be overcome in combination with the movement velocities of the support elements through the device require strong and thus heavy chains. The drive wheels and motors are also sized accordingly. Thus, a device of this type includes very massive and heavy components.

For quite a while, persons skilled in the art have discussed how to design a chainless drive for a device of this type. In this context, for example, the German utility model DE 210 79 U1 has been published. Herein, a lantern pinion teething is shown which directly engages the support elements and pushes the support elements through the device. Thus the lateral elements are configured as arcuate rail systems connecting the upper main element and the lower main element. The support elements are provided with spacers for moving through the lateral elements.

From EP 1 495 A1 additional drive concepts are known through which the support elements, cell plate adjoining cell plate, can be pushed through a device of this type. Among other things, a worm drive conveyor is proposed in this context.

Pushing the cell plates through the device has the essential advantage that a chain which has elongation problems can be omitted. As a matter of principle however, there remains the problem that excessive friction forces have to be overcome and typically a support that is central in feed direction is still required for the cell plates. Furthermore, also when pushing the cell plates through the device it is not assured that the distances of the support elements or containers in feed direction are constant. As a matter of principle there is the risk that contaminating particles collecting between the support elements, for example production residues, can add up to form considerable total deviations.

Also though EP 1 495 997 A1 proposes for friction minimization to push the cell plates through the device on rollers, besides the recited summation errors, the problem remains that the support proposed for the cell plates therein cannot be used in the machine for filling bottles. Bottles are typically supported at the bottleneck when moved through the filling device. Thus, the support elements are approximately cut in halves along a row of container receivers. For inserting the bottles, the support element halves are lifted and are moved apart parallel to the feed direction. The bottle is typically inserted from above into the opening thus widened. Subsequent thereto, the support element halves are moved back into their starting positions and enclose the bottle neck.

Besides the fact that splitting the support elements into support element halves augments the problem of summation errors and thus the problem of exact alignment of the support elements under the operating stations, EP 1 495 997 A1 does not permit the predescribed opening of the cell plates for inserting the bottles.

BRIEF SUMMARY OF THE INVENTION

Thus, it is an object of the invention to configure a device with a chainless drive and support elements supported on rollers so that an exact positioning of the containers at the operating stations is provided.

The object is achieved by a device with the features of claim 1, in particular with the characterizing features, according to which at least two support elements are arranged on a common frame and are run by the frame on rollers in an endless manner through the device.

It is an essential advantage of the invention that at least two, preferably four support elements are arranged on a common frame and positioned relative to one another. Insofar the possible summation error through collecting contaminations between the support elements is reduced at least by a factor of 2; in an advantageous embodiment it is even reduced by a factor of 4.

It is provided in a particularly preferred embodiment that the rollers are arranged at the common frames of the support elements and the frames are run through the rollers on running tracks through the device.

The essential advantage here is in the maintenance of the rollers. In case of a roller defect, a support element unit can simply be removed and can be replaced by a unit provided with intact rollers. The roller replacement can then be performed subsequently thereto without having to stop production.

It is furthermore provided that frames are connected with one another through connection elements at least during the movement of the support elements along the operating stations.

The high acceleration during feeding, thus when moving the support elements on their frames in feed direction, due to the substantial friction reduction, can have the effect that the frames do not come to a standstill at the next operating station. This generates small clearances between the particular frames which causes considerable noise during machine operation when frames contact one another. Furthermore, jolts of this type introduce high levels of stress into materials. Coupling the frames to one another, besides facilitating controlled acceleration, also provides controlled braking and positioning of the frames relative to the operating stations. Thus, a device with connected frames in this respect implements advantages of a chain drive.

Thus, it is required that the connection of the frames with one another, besides the required fit clearance between the connection elements, has no clearance.

In order to simplify moving the support elements on their frames from the upper main element into the lower main element, for example through a lifting device, it is provided that the connection elements arrange the frames at one another in horizontal direction; however a relative vertical movement of two adjacent frames relative to one another disengages the connection.

In order to facilitate clean coupling and decoupling of the frames at one another and in order to simultaneously provide a connection of the frames with one another that essentially doesn't have any clearance, it is provided that the connection elements respectively include a groove with concave sidewalls and a respective coupling member, wherein the coupling member of a first connection element is inserted without clearance in the groove of a second connection element between the apex lines of the concave groove sidewalls.

In particular the concave sidewalls of the groove expand in upward direction and in downward direction like a funnel so that a clean insertion of the coupling member is provided. Simultaneously the coupling member is run through this geometry self-acting to the tightest location of the groove in the portion of the apex lines of the sidewalls where it is inserted without clearance.

The geometry for connecting the frames supporting the support elements can be substantially improved in that the coupling member includes convex side lobes aligned parallel to the groove sidewalls, wherein an arrangement of the apex line of the concave groove sidewalls approximately at the same levels and of the convex coupling member sidewalls of intermeshing connection elements provides a connection of the frames with one another that is essentially without clearance.

The support elements supported on frames form an essential prerequisite that the device according to the invention can also be used for filling bottles. Consequently, it is provided that the support elements are split in half along a row, that each support element half includes partial recesses, and that partial recesses oriented towards one another of adjacent support element halves jointly form a receiver for containers, and wherein the support elements are configured vertically raisable on the common frame and are laterally movable in raised position for opening the receivers for inserting the containers.

Insofar only supporting the support element halves on a common frame facilitates opening and closing the support elements analogous to prior art chain driven devices.

Besides exact alignment of the containers in feed direction, the so-called longitudinal centering, also an alignment transversal to the feed direction (transversal centering) has to be provided for correct operations of the device.

In chain driven filling machines which pull the support elements through the machine, essentially a correct position of the chain suffices for the transversal orientation.

In devices with a chainless drive in which the support elements are essentially pushed through the device like in EP 1 495 997 A1, each support element by itself has to be transversally centered. Thus it is an object of the invention to provide a technical device that is configured accordingly.

The object is achieved by a device with the features of claim 10 in particular with the features of the body of claim 10 according to which the rollers include a centering device through which the support elements are oriented transversal to the feed direction. Thus, it is provided in particular that the rollers roll on rolling paths when the support elements are fed in an endless manner and rollers and rolling track interact in a centering manner.

When the rollers through which the support elements are movable through the device include the centering device themselves, a continuous centering can be provided in a manner that is technically particularly simple. It is for example conceivable that the rollers for centering run in a groove or include a separate centering arm which is supported at a groove.

It is particularly preferred, however, when the rollers center the support elements in a transversal manner by interacting with the running paths. This is provided in particular in that the cross-sectional contour of the running surfaces of the rollers forms the centering device by interacting with the running surface contour of the running tracks.

This type of centering is provided through the feed movement itself and is therefore continuous and permanent. Should a support element, while being fed through the device, be pressed out of its transversally centered position, e.g. through a foreign object, the feed movement by itself already provides re-centering. The centering device is provided in a technically very simply manner and has low maintenance and low wear.

In a particularly preferred embodiment, it is provided that the cross-sectional contour of the running surfaces of the rollers is approximately V-shaped and the running surface contour of the running tracks is cambered in a partial circle, wherein it is presumed that the running tracks are formed by a running bar that has a circular cross-section.

However, also the geometric reversal is conceivable where the running path forms an approximately V-shaped groove in which the running rollers roll with a running surface that has a cross-section of a partial circle.

As described supra, it is known in the art to increase the throughput of a filling device in that the containers of two support elements are simultaneously treated at the operating stations. Thus, in the prior art, two support element halves of two support elements are moved apart parallel to the transport direction. This also is called opening the cell plates. The bottles are moved from above through the open cell plates into the contact plane of the cell plates on the chain. Subsequently, the cell plate halves are moved back again until they contact the drive chain. This is called closing the cell plates. When closing the cells, the partial recesses of the support element halves envelop the bottle neck and support the bottle.

Since the cell plates have to move very far apart in order to allow the bottle element to pass through, the bottles are not inserted into two directly adjacent support elements. Instead, always two cell plates are opened that are offset from a closed cell plate. During insertion of the bottles into the support elements, the bottles are supported in their positions by suction elements.

Therefore, the prior art bottle feed device with the feed devices arranged above the upper main element and the suction elements arranged below the upper main element are configured rather complex. Eventually also the time requirement for the opening movement of the support element halves is detrimental since it limits the machine timing and thus the machine throughput.

Thus, it is an object of the invention to provide a novel container feed device which facilitates a quicker opening movement of the support elements with substantial configuration simplification.

The object is achieved by a device with the features of claim 16, in particular with the features of the body of claim 16 according to which the container feed device feeds the containers from below to the support elements.

Differently from the prior art, the inventors have recognized that it is a substantial configuration disadvantage of the prior art bottle feeds that the entire body of the bottle has to be passed through between the support elements in order to eventually support the bottleneck that has a relatively small diameter. This type of prior art bottle feed has the consequence that the necessary large opening width causes the opening time that limits the operating cycle. Furthermore this type of feed is also the reason that support element halves have to be moved apart which are not directly adjacent to one another but are offset by at least one support element. This causes a comparatively long extension of the bottle feed device in transport direction. Also, the comparatively long movement path of the suction elements stabilizing the bottles is caused by the bottle feed from above.

Based on this the inventors have recognized that the container feed from below to the support elements has essential advantages. Since only the bottle neck still has to be inserted between the support element halves, the necessary movement space and the movement time for the opening support element halves is substantially reduced. Consequently, at least two directly adjacent support elements can be outfitted with bottles. The installation space necessary for the container feed device in feed direction is substantially reduced. Also the vertical movement space for the bottles can be substantially reduced.

A device is particularly advantageous which is characterized in that the container feed device lifts the containers for inserting into the container receivers and the lifting process induces the opening movement of the support element halves.

In order to provide a solution with a particularly simple configuration, the container feed device is joined with the device for opening the support element halves. Thus, it is provided that the vertical lifting movement through which the bottles are moved in a direction towards the support elements at least induces the opening movement. It is provided in particular that the container feed device includes a lifting device wherein the vertical movement of the lifting device impacting the support element halves causes the opening movement of the support element halves through raising the support element halves.

In one embodiment in which the support element halves include support members which engage device side slotted links and control the opening movement of the support element halves, the container feed device is the container feed device which also causes the opening of the support element halves. For this only a vertical movement is necessary which raises the support element halves. Through the interaction of support members and slotted links, the vertical movement is transformed into an opening movement of the support element halves.

Thus, it is particularly advantageous that raising the containers, in particular the bottles and the vertical movement of the lifting device for opening the support element halves can be provided through a common drive.

For this purpose it is only necessary that the lifter is movement coupled with the platform but arranged so that it is movable relative to the platform.

Eventually the present invention also relates to a method for feeding containers to a container filling device, in particular for bottles or beakers with food products, in particular liquid to paste-like dairy and fat products, juices, waters and similar, including an upper main element, a lower main element and lateral elements connecting the upper and the lower main element, a plurality of support elements which are moved on rollers in an endless manner through the device past operating stations along the upper main element, the lateral element and the lower main element, wherein the support elements include receivers for containers arranged transversal to the feed direction in series.

This method achieves the object according to which the container feeding shall be simplified through the characterizing method steps:

a) feeding support elements arranged on a platform with containers;

b) moving the platform to a location of the device where the containers are inserted into the support elements;

c) lifting the support element halves from its contact plane for performing the opening movement;

d) lifting the containers into the contact plane of the support elements;

e) lowering the support element halves into the contact plane for performing a closing movement and for safely supporting the containers in the container receivers.

In a particular embodiment of the method, it is provided that a raising of the platform is performed for method step c) which raising brings a lifting device into contact with the support element halves, wherein the lifting device moves the support element halves into an open position through a vertical movement relative to the platform.

It is furthermore provided that the lifting device is lowered for method step e).

BRIEF DESCRIPTION OF THE DRAWINGS

Additional advantages of the invention can be derived from the subsequent description of advantageous embodiments of the invention illustrated in drawing figures, wherein.

DETAILED DESCRIPTION OF THE INVENTION

Figure 1:
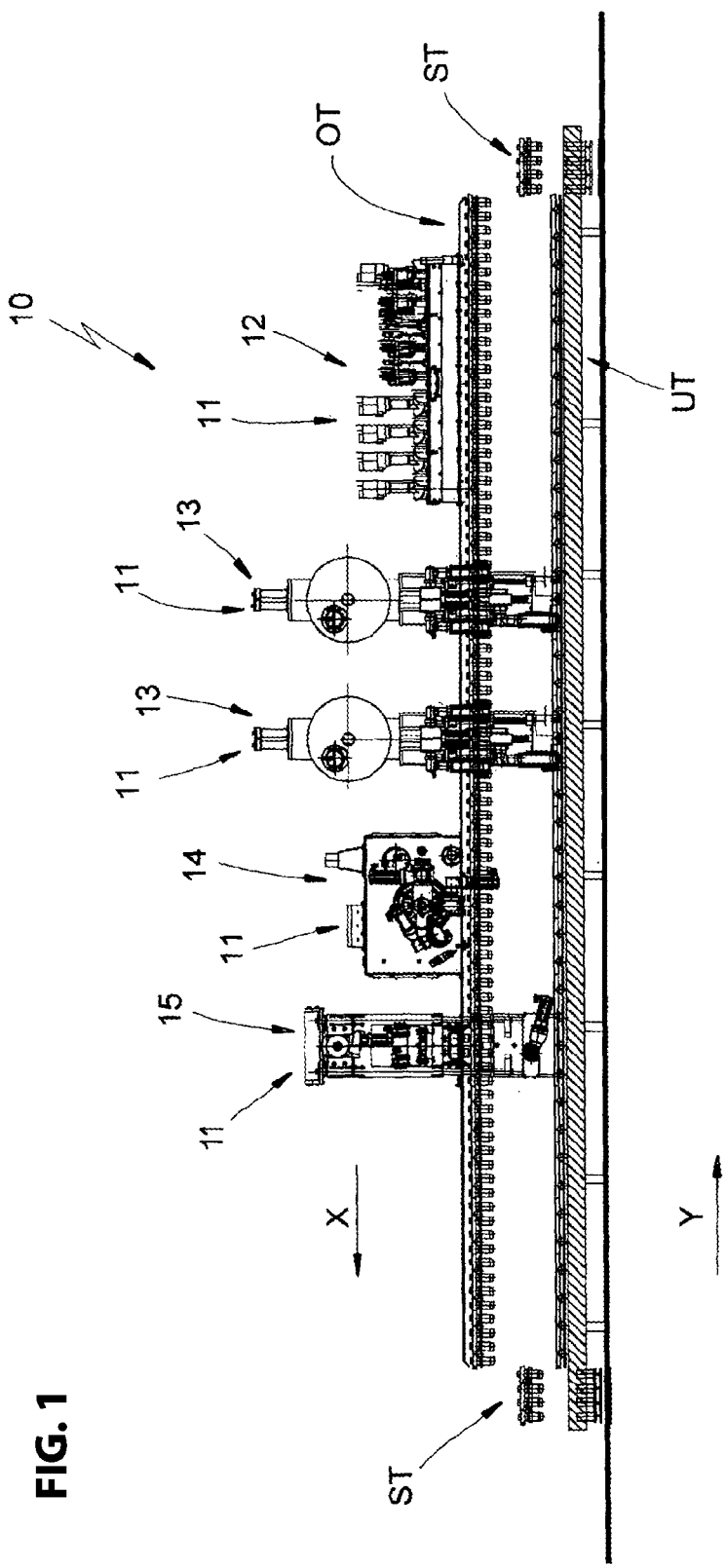
FIG. 1 illustrates an overview of the device according to the invention.

A device for filling container with food products is overall designated with the reference numeral 10 in the figures.

FIG. 1 illustrates the device 10 in its entirety. The filling device for the containers 10 includes an upper main element OT, a lower main element UT offset there from and two lateral elements ST.

Along the arrow direction X the support elements that are not designated in more detail in FIG. 1 are supported along various operating stations 11 in the upper element OT so that it is transferable through a first lateral element ST into the lower element UT. In the lower element UT the support elements move in arrow direction Y to the second lateral element ST in order to be moved from there back into the upper main element OT. In this respect the support elements run through the device 10 in an endless manner. The operating stations 11 illustrated in FIG. 1 are in particular a sterilization- and drying unit 12, dosing stations 13, a cap placement station 14 and a cap screwing station 15.

Figure 2:
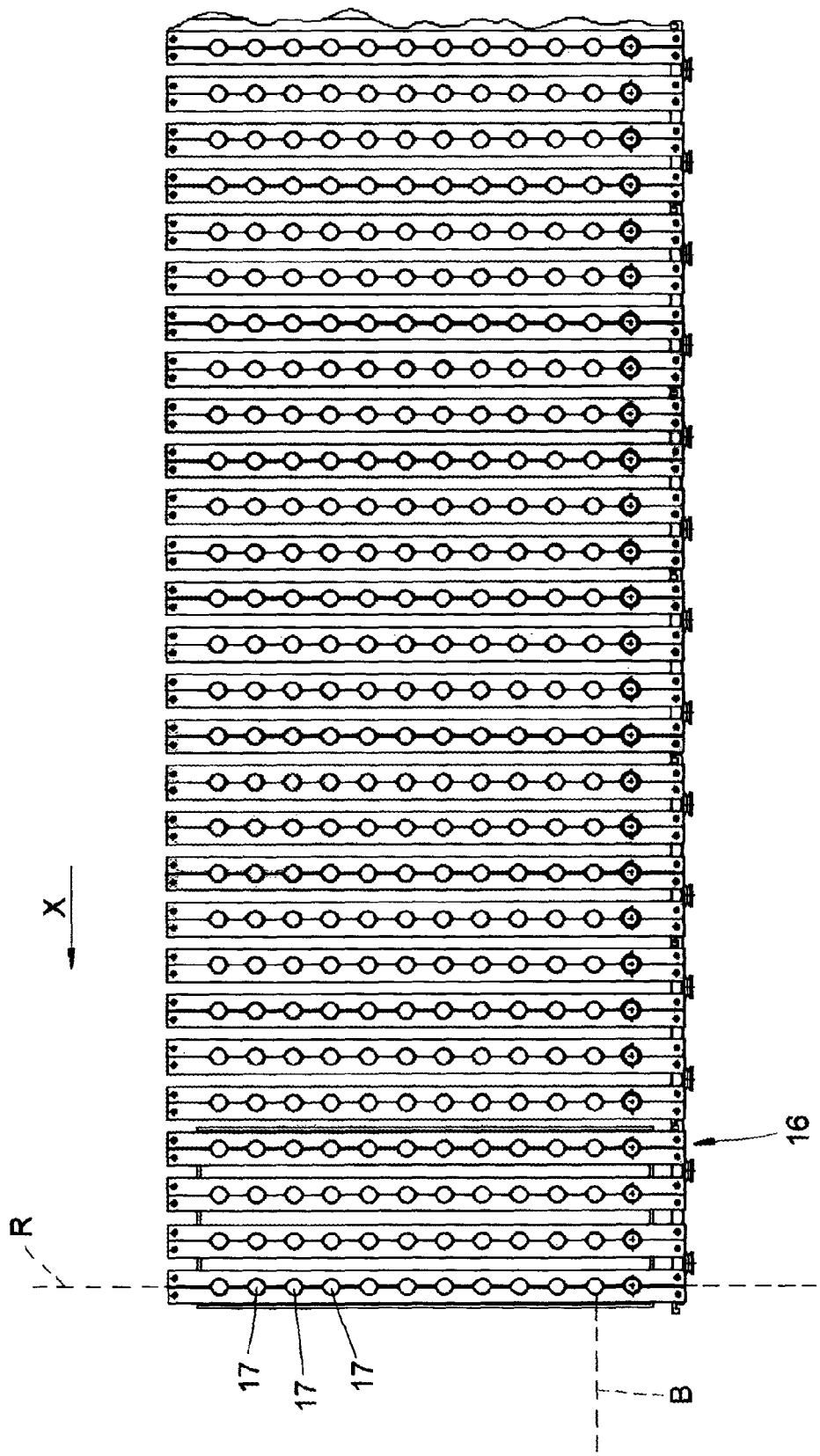
FIG. 2 illustrates a partial view of the device according to FIG. 1.

FIG. 2 illustrates a top view of a partial section of the upper main element OT in which plural support elements 16 which are also designated as cell plates are arranged behind one another in feed direction. Each support element 16 includes a plurality of container receivers 17 arranged transversal to the feed direction X. Consequently the container receivers are arranged adjacent to one another in rows R. The container receivers of plural support elements 17 arranged behind one another in feed direction X form tracks B arranged parallel to the feed direction X.

Figure 3:
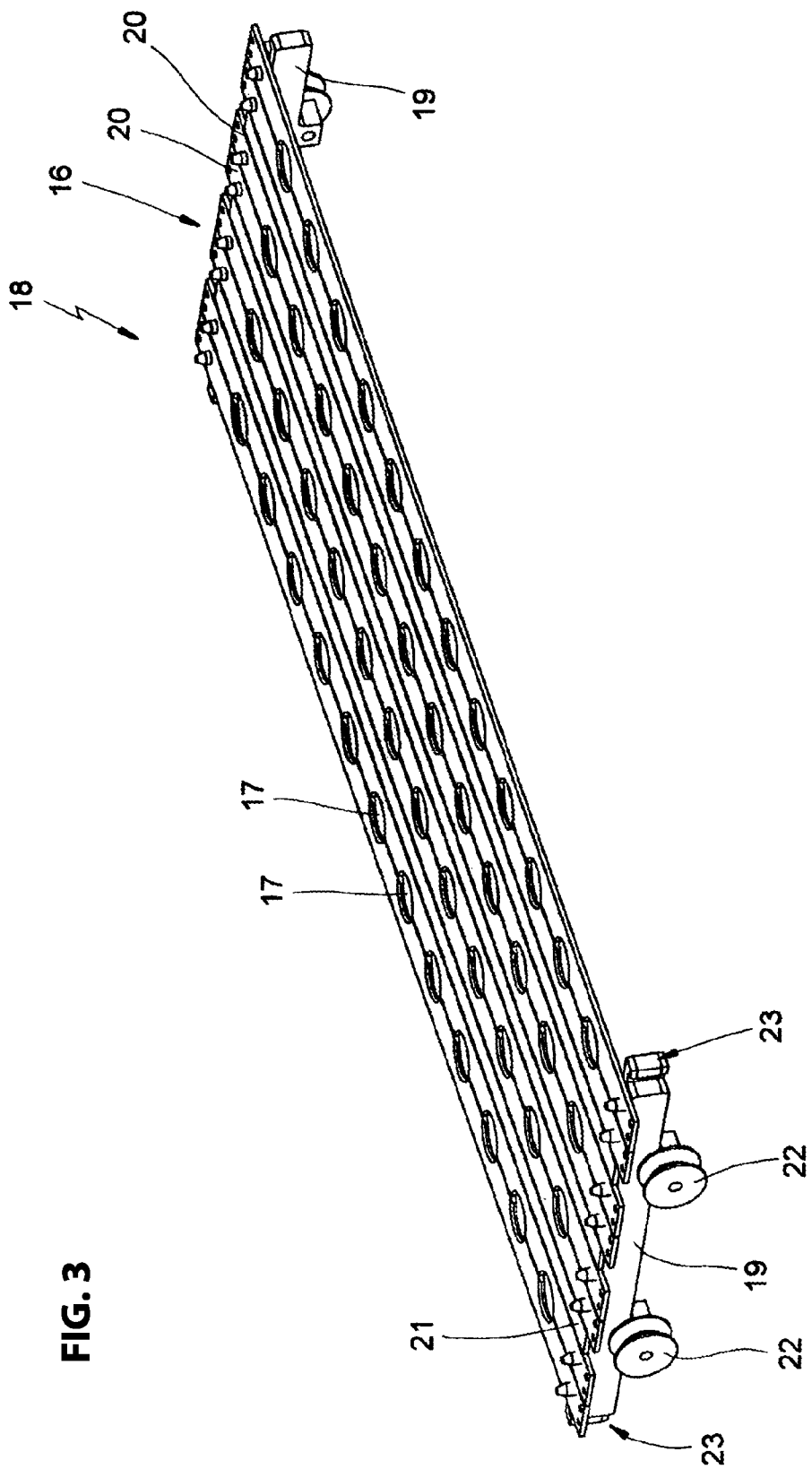
FIG. 3 illustrates a perspective view of the support elements arranged at a frame.

FIG. 3 illustrates a frame 18 which includes two longitudinal profiles 19 arranged offset from one another and parallel with respect to the feed direction X. The support elements 16, four in this instance contact the longitudinal profiles 19 with their ends. In the present embodiment the support elements 16 include two support element halves 20 which are provided through splitting the support elements 16 approximately in half along a row R. The longitudinal profiles 19 are arranged at one another through transversal profiles 21 and furthermore carry support rollers 22 on which the frame 18 is run through the device 10. The longitudinal profiles 19 form connection elements 23 and their ends, wherein the connection elements are subsequently described in more detail and through which plural frames 18 can be coupled with one another.

Figure 4:
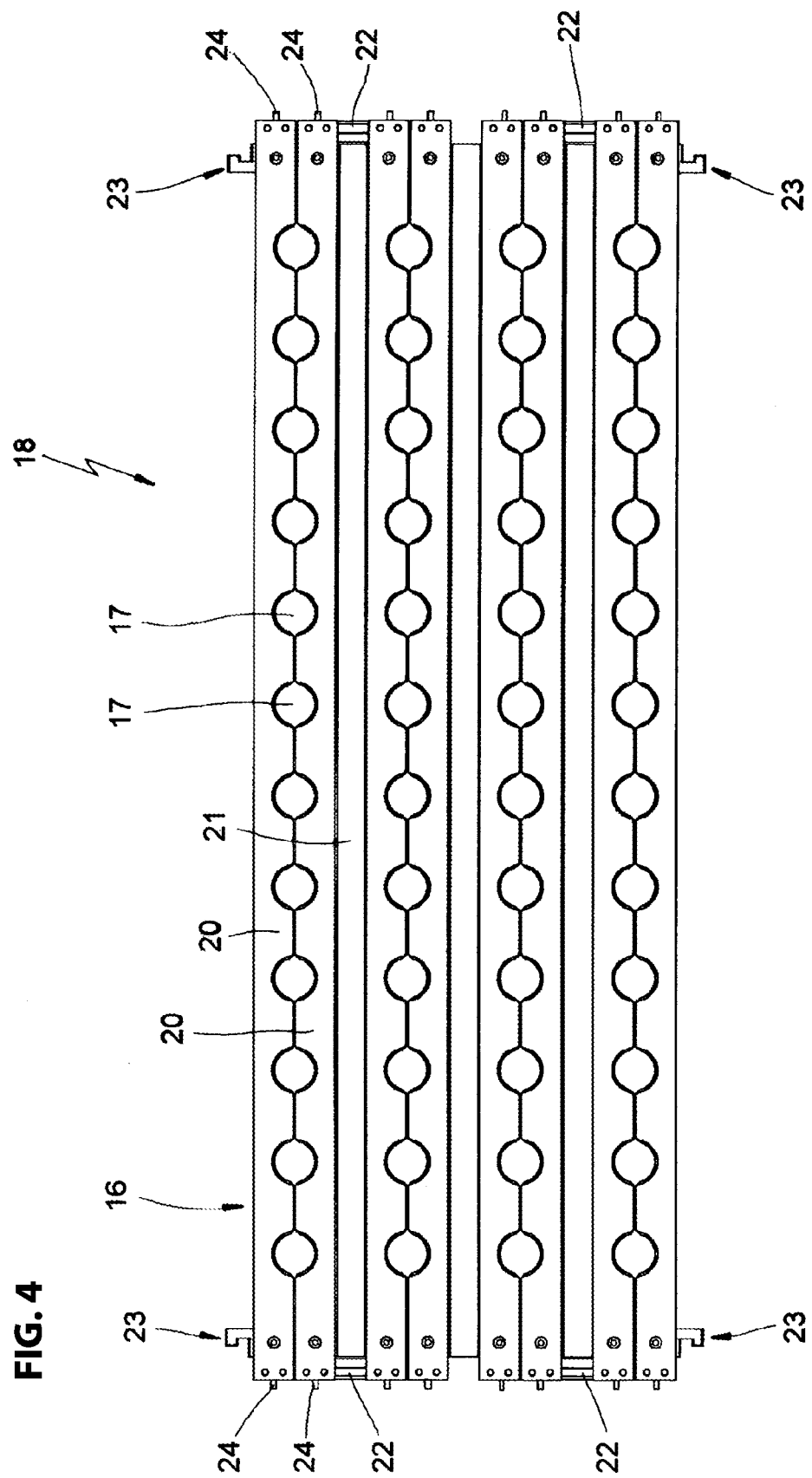
FIG. 4 illustrates a top view according to FIG. 3.

From FIG. 4 which provides a top view of the frame illustrated in FIG. 3 the configuration is illustrated in more detail. Besides the components described supra support members 24 are provided at the ends of the support elements halves 20 arranged parallel to the feed direction X, wherein the support members 24 are used for controlling the opening movement of the support elements halves 20.

Figure 5:
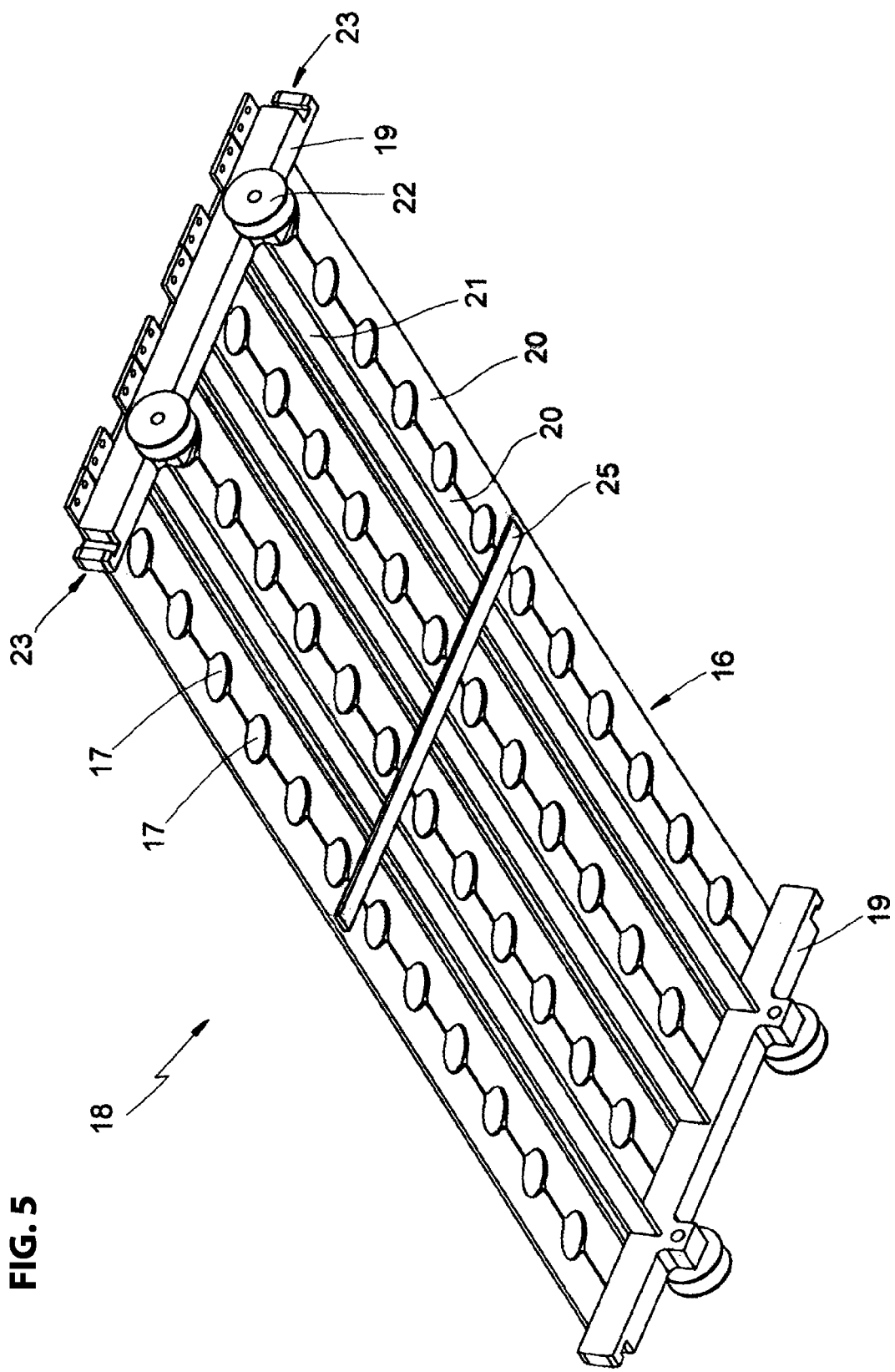
FIG. 5 illustrates a perspective view from below of the frame according to FIG. 3.

A bottom view of the frame 18 from below according to FIG. 3 is illustrated in FIG. 5. From this illustration it is apparent that the transversal profiles 21 support a support rail 25 below the support elements 16. The support rail 25 is arranged approximately central between the longitudinal profiles 19 of the frame 18. The contact rail 25 is used for stabilizing the support elements 16 so that the support elements 16 due to their own weight or the weight of the filled container do not sag in the center. The transversal profile 18 as evident from this figure is configured as a T profile for static reasons.

Figure 6:
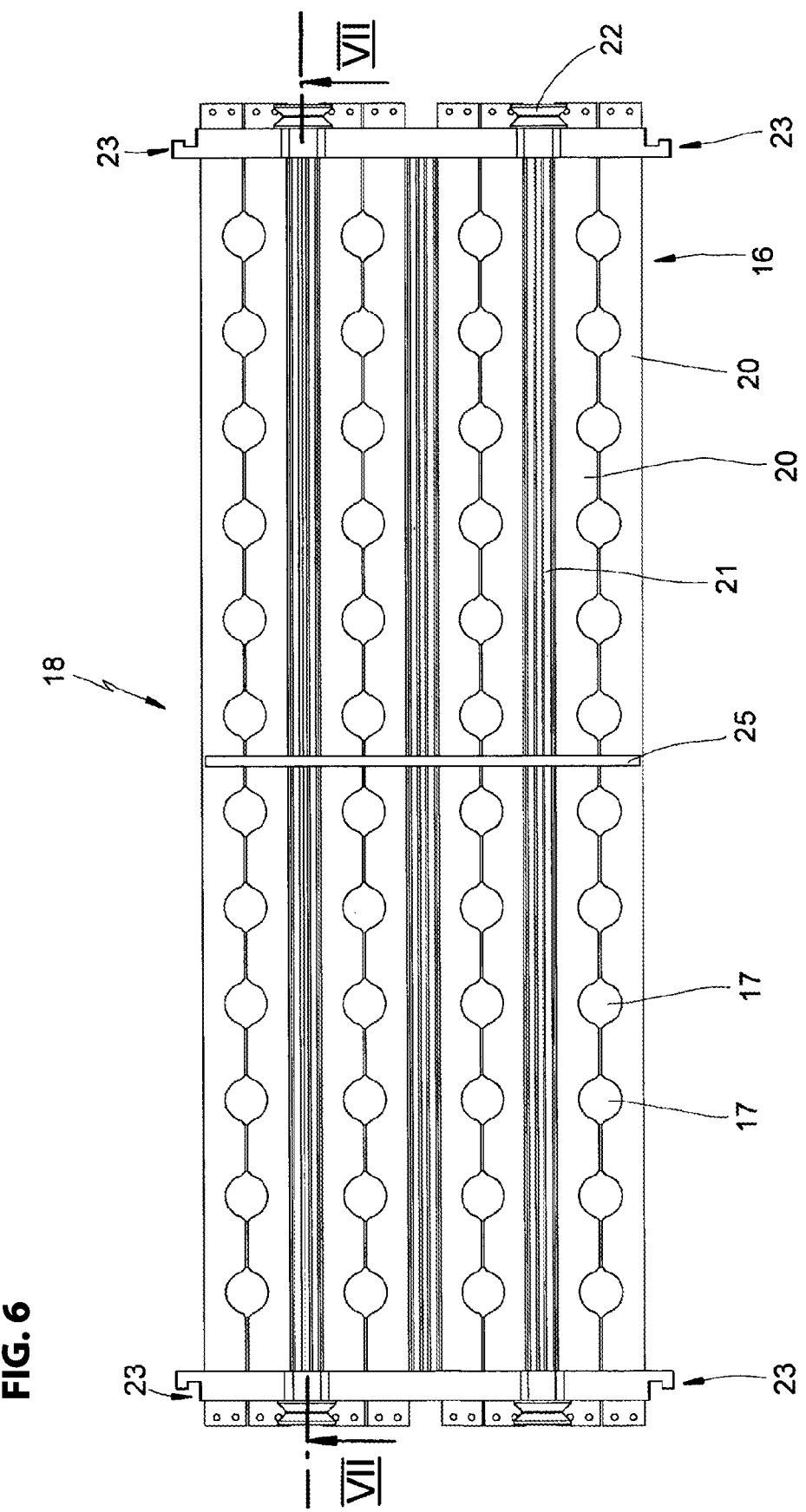
FIG. 6 illustrates a bottom view of the frame according to FIG. 3.

FIG. 6 illustrates the top view of the bottom side of the frame 18. This figure is supplemented over FIG. 5 with the illustration of the position of the sectional plane VII along which the frame 18 according to FIG. 7 is vertically cut.

Figure 7:
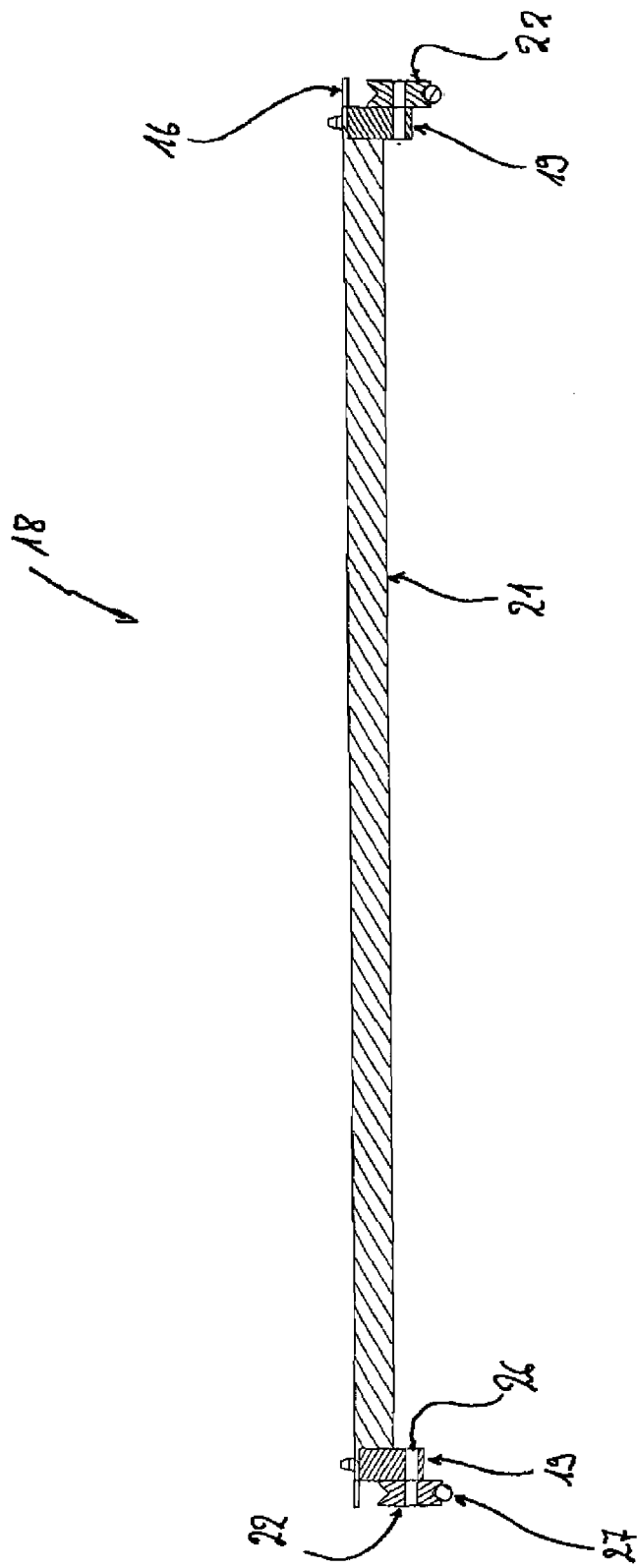
FIG. 7 illustrates a sectional view of the frame according to section line VII in FIG. 6.

From the sectional view of FIG. 7 it is initially evident that each roller 22 is rotatably arranged on a roller axis 26. The roller axis 26 in turn is anchored in the longitudinal profile 19 of the frame. It is furthermore evident from FIG. 7 that the rollers 22 of the frame 18 contact running bars 27 of the device 10.

Figure 8:
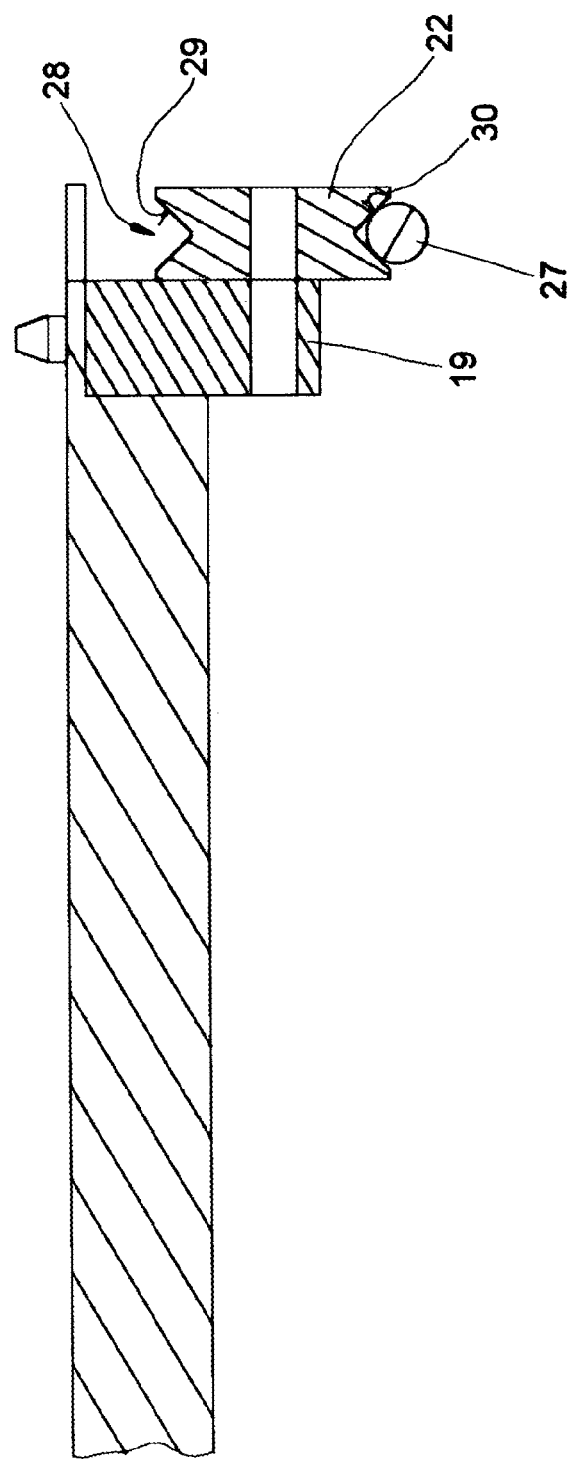
FIG. 8 illustrates a partial view of the cut frame according to FIG. 7.

FIG. 8 illustrates a detail of the sectional view according to FIG. 7. From this detail it is particularly evident that the roller 22 includes a circumferential V-shaped or roof shaped groove 28. Consequently the cross section contour of the running surface 29 of the roller 22 is also approximately V-shaped. The running track configured as running bar 27 includes a circumferential cross section. The running surface 30 of the running bar 27 is formed by the surface portion oriented towards the roller 22. As evident from FIG. 8 the running bar 27 with its running surface 30 is inserted into the V shaped groove of the roller 22 so that the running surfaces 29 and 30 contacts one another.

Figure 9:
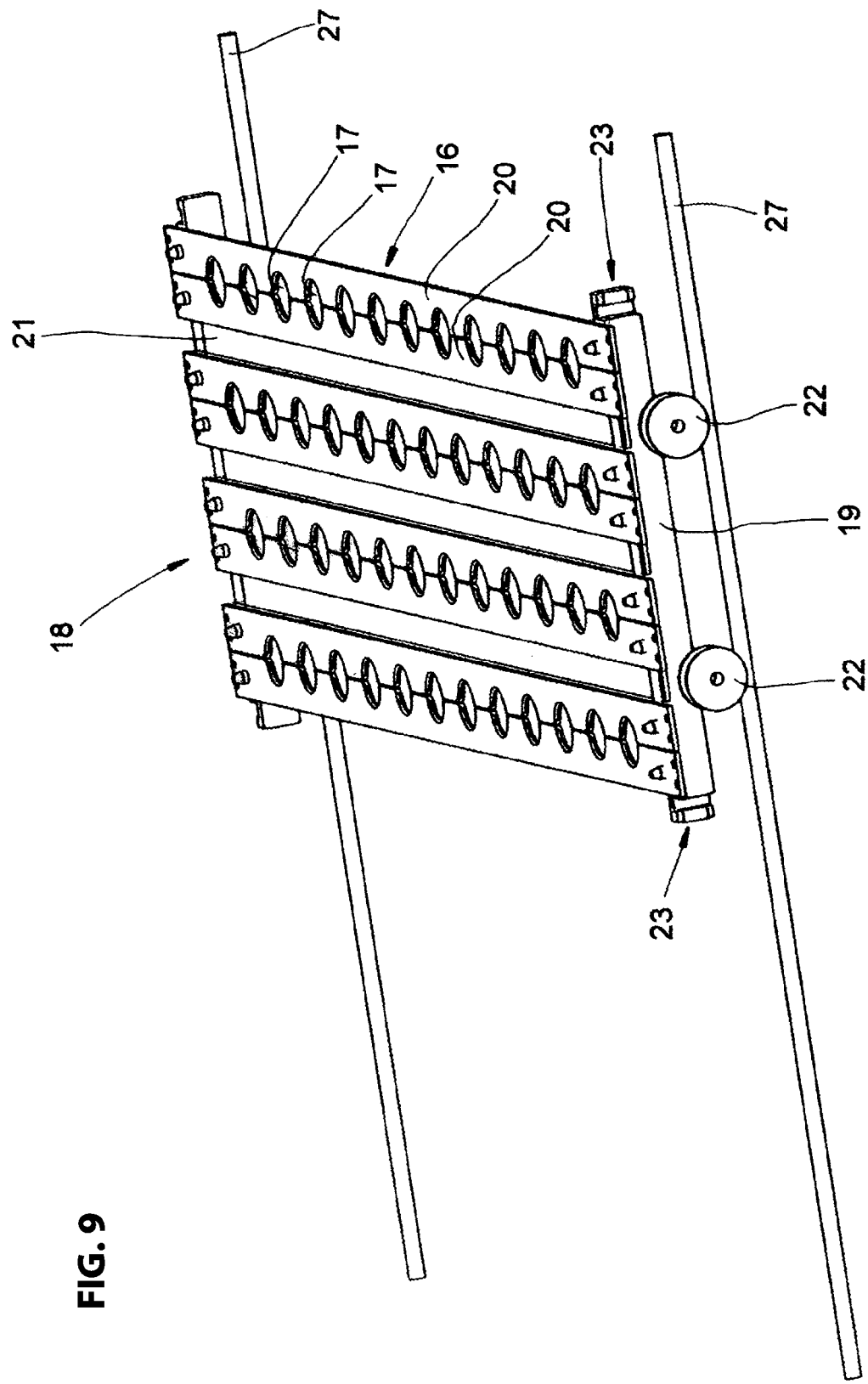
FIG. 9 illustrates a perspective view of the frame according to FIG. 3 sitting on running rails.

The illustration of FIG. 9 illustrates a frame 18 which contacts the running bars 27 of the device 10. The running bars 27 are arranged in the upper main element OT and in the lower main element UT so that the frames 18 with the support elements 16 are run on the running bars 27 through the device 10 in an endless manner.

Figure 10:
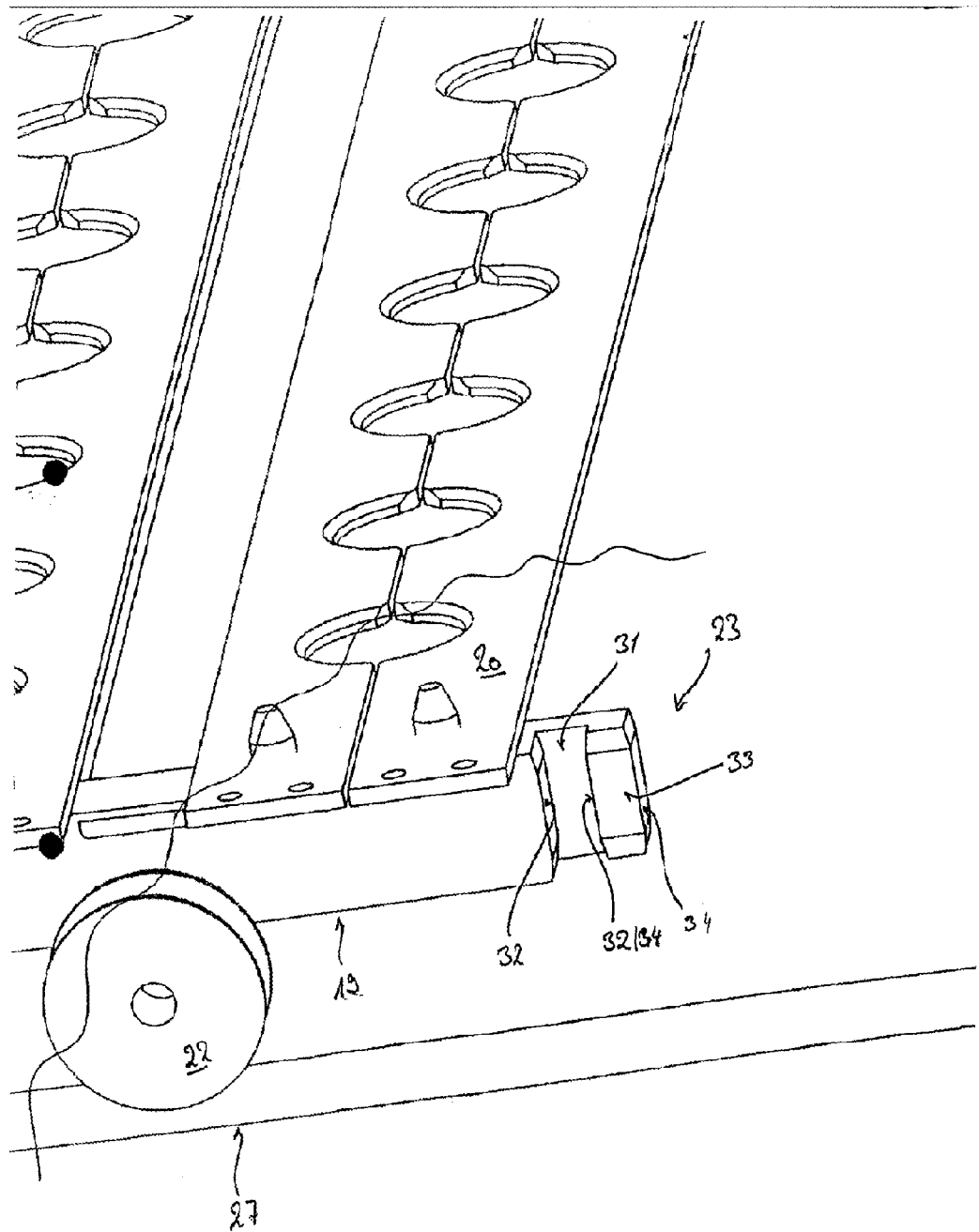
FIG. 10 illustrates a detail view of the connection element of a frame according to FIG. 3.

FIG. 10 illustrates a cut out detail based on which the configuration of the connection element 23 of the longitudinal profile 19 is described in more detail. The connection element 23 forms a portion of the longitudinal profile 19 and is respectively arranged at ends of the longitudinal profile 19 oriented towards an adjacent frame 18. The connection element initially includes a vertically aligned groove 31 with approximately concave groove side walls 32. Directly adjacent to the groove 31 the longitudinal profile 19 forms a coupling member 33. The side lobes 34 of the coupling member 33 which side lobes are aligned parallel to the groove side walls 32 are configured convex.

In the embodiment illustrated in FIG. 10 the groove 31 and the coupling member 33 are configured so that the concave groove side wall 32 adjacent to the coupling member 33 simultaneously forms the convex side lobes 34 of the coupling member 33. The side lobe 34 oriented away from the groove simultaneously forms the face wall of the longitudinal beam 19. The grooves 31 thus offset the coupling members 33 from the support elements 16. It is appreciated that connection elements 23 oriented towards one another of adjacent frames 18 are configured in a mirror image to each other.

The connection elements 23 of adjacent frames 18 engage one another during a movement along the upper and lower main component OT/UT. Adjacent frames 18 are connected with one another in this manner. Thus, the frames 18 that are moved in a timed manner through the device 10 can be accelerated and decelerated in a controlled manner. The coupling member 33 in its width measured in movement direction is sized in the portion of the apex lines of the convex side walls 34 so that it is essentially inserted into the groove 31 without clearance when the apex lines of the groove side walls 32 are approximately arranged in one plane with the apex lines of the side lobes 34. This prevents excessive noise generation when accelerating and decelerating the frames 18 through a contact of connection elements 23 of adjacent frames 18.

The coupling of the frames 18 is separated in that adjacent frames 18 are moved vertically toward one another. Thus, the coupling elements 33 slide out of the grooves 31. This vertical movement occurs when a frame 18 switches through the lateral element ST into the lower main element UT.

Compared to the prior art in which the support elements 16 contact one another, arranging the support elements directly on the frames 18 has substantial advantages. In the first place the summation errors which lead to an erroneous faulty orientation of the support elements relative to the operating stations are reduced by a factor which corresponds to the number of the support elements 16 mounted on the frames. Summation errors of this type occur when contaminants adhere between adjacent support elements 16 according to the prior art.

Since according to the invention plural support elements 16 are arranged on a frame 18 and are moved through the device 19 through the frames 18 the summation errors are substantially reduced. In the frames illustrated in the embodiment which support four support elements 16 the summation error is reduced by a factor of 4.

Figure 11:
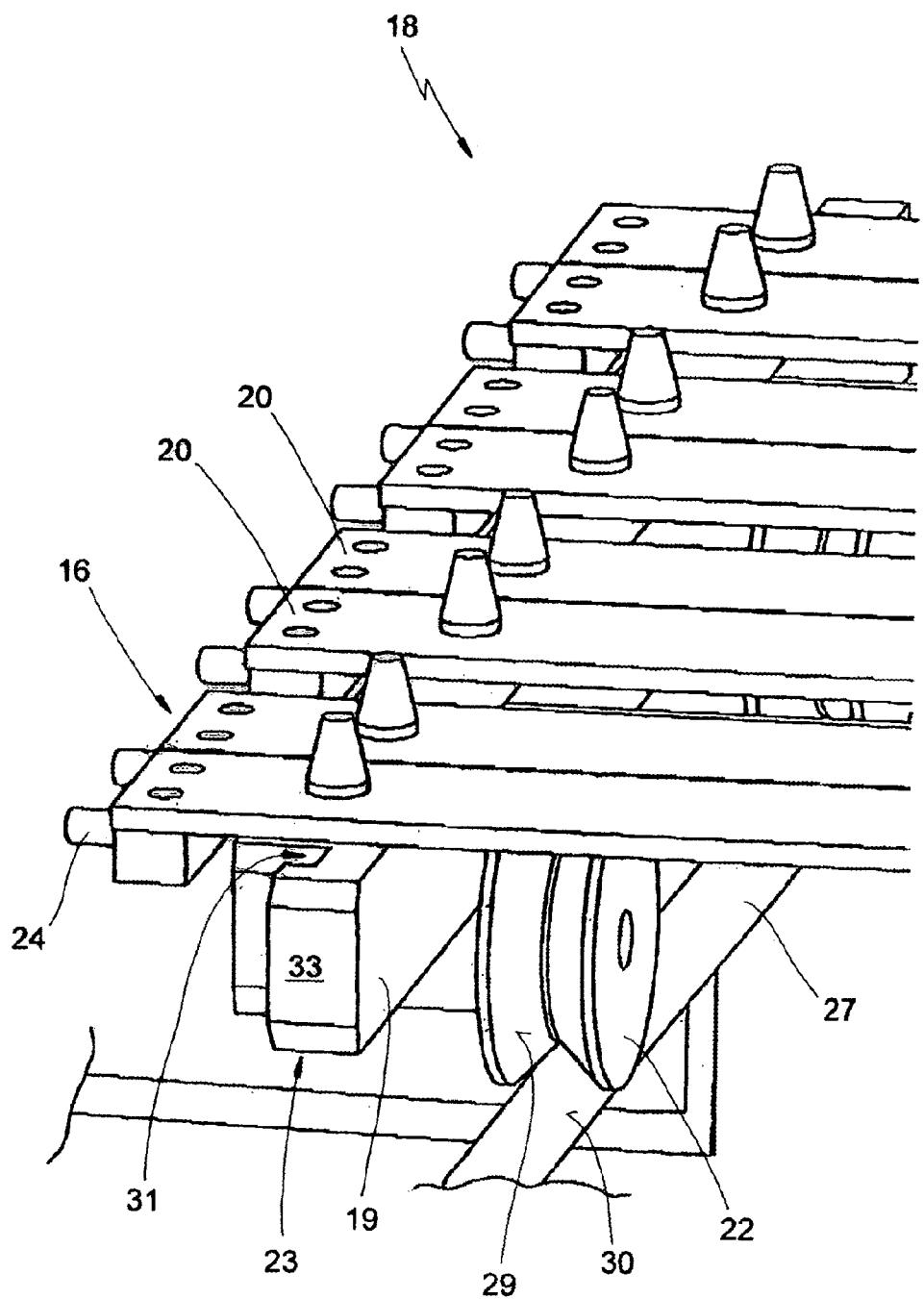
FIG. 11 illustrates an interaction of roller and running rail.

In FIG. 11 the frame 18 that is run on the running rail 27 through the device 10 is illustrated in a perspective detail view. Special emphasis is put on a centering interaction of roller 22 and running rail 27. The geometry of the running surfaces 29 is approximately V-shaped. The running surface 30 of the running rail 27 that has a cross section of a partial circle is disposed in the V-shaped groove of the roller which forms the roller side running surfaces 29. It is evident that during a movement of the frame 18 through the device the running rail 27 as a matter of principle is arranged as deep as possible in the V-shaped groove of the roller 22. In case no transversal forces occur the roller 22 is supported on the running rail 27 in a centered manner. Thus, a secure centering of the frames 18 is provided transversal to the feed direction which assures that the frames 18, in particular the support elements 16 are correctly aligned with their container receivers 17 relative to the operating stations 11.

In case transversal forces caused by interferences impact the frames 18 during operation of the device wherein the transversal forces move the frames off center, the frames 18 immediately slide back into their correct positions due to the interfacing geometries of the running rails 27 and the rollers 22 after the transversal forces cease.

Figure 12:
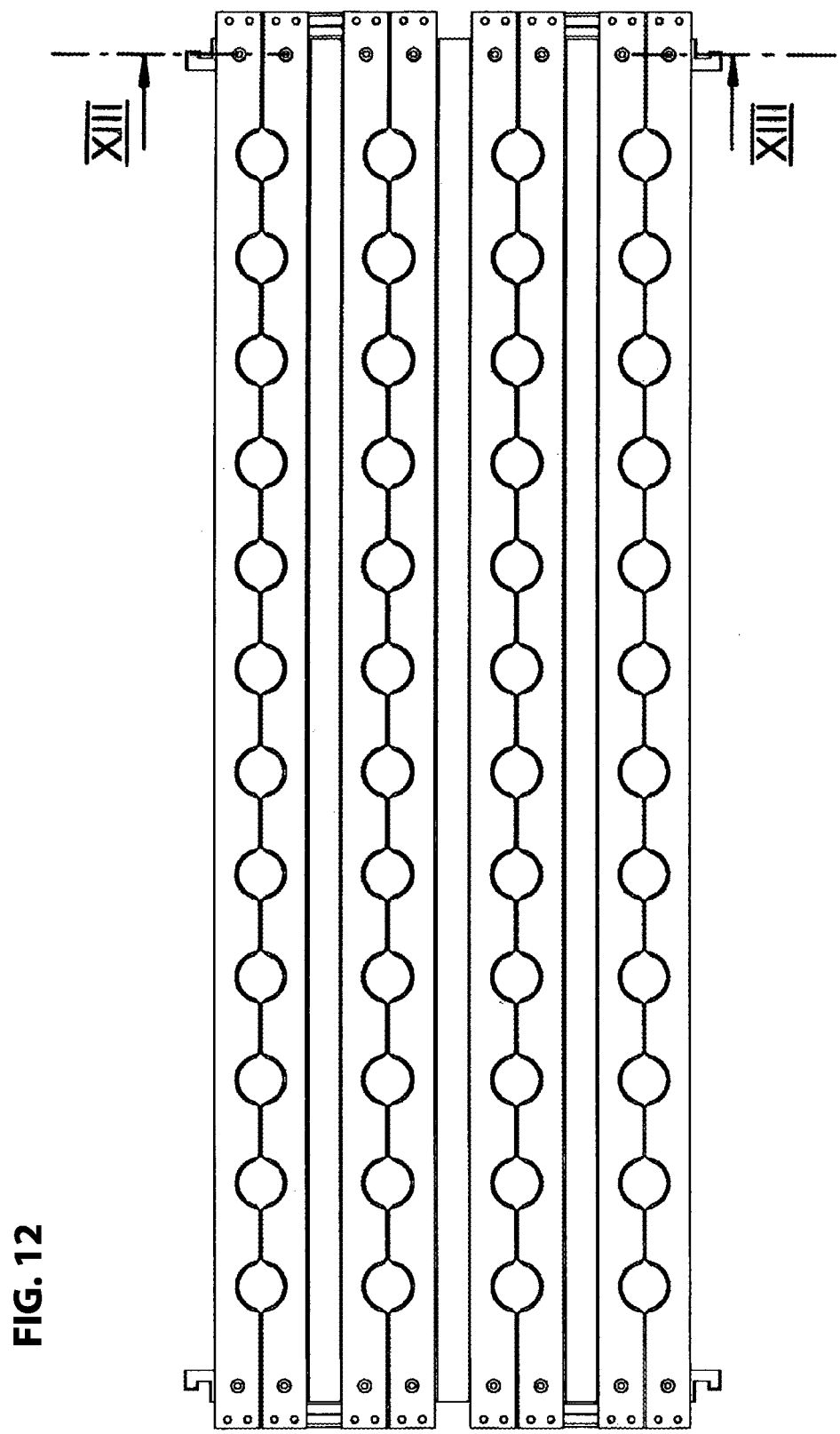
FIG. 12 illustrates a top view of a frame according to FIG. 3.
Figure 13:
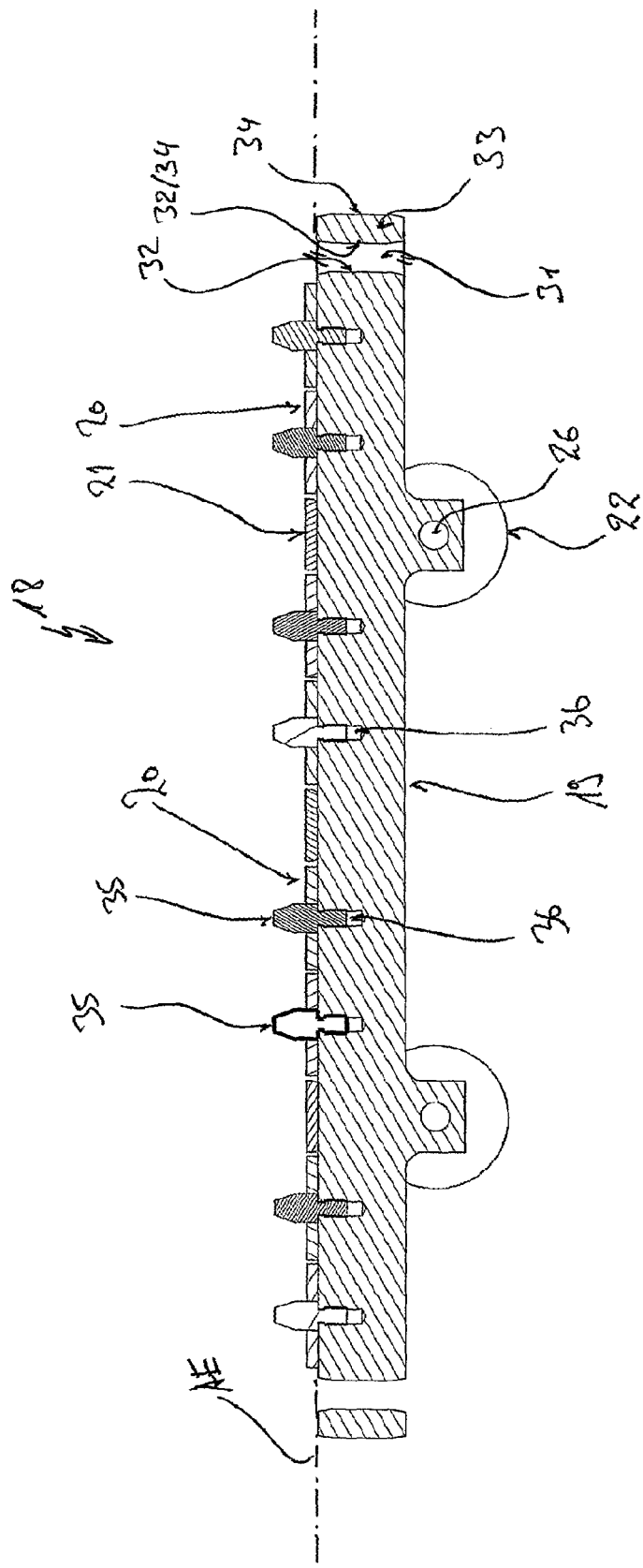
FIG. 13 illustrates a sectional view of the frame according to section line XIII in FIG. 12.

FIG. 13 is a sectional view of the frame 18 along the longitudinal profile 19 according to sectional line XIII in FIG. 12. The support element halves 20 are supported by the pins 35, but they are moveably arranged in vertical direction on the frames. The pins 34 are inserted into bore holes 36 formed by the longitudinal profile 19. The vertically moveable support of the support element halves 20 is required in particular for such filling devices 10 that are used for filling bottles.

Figure 14:
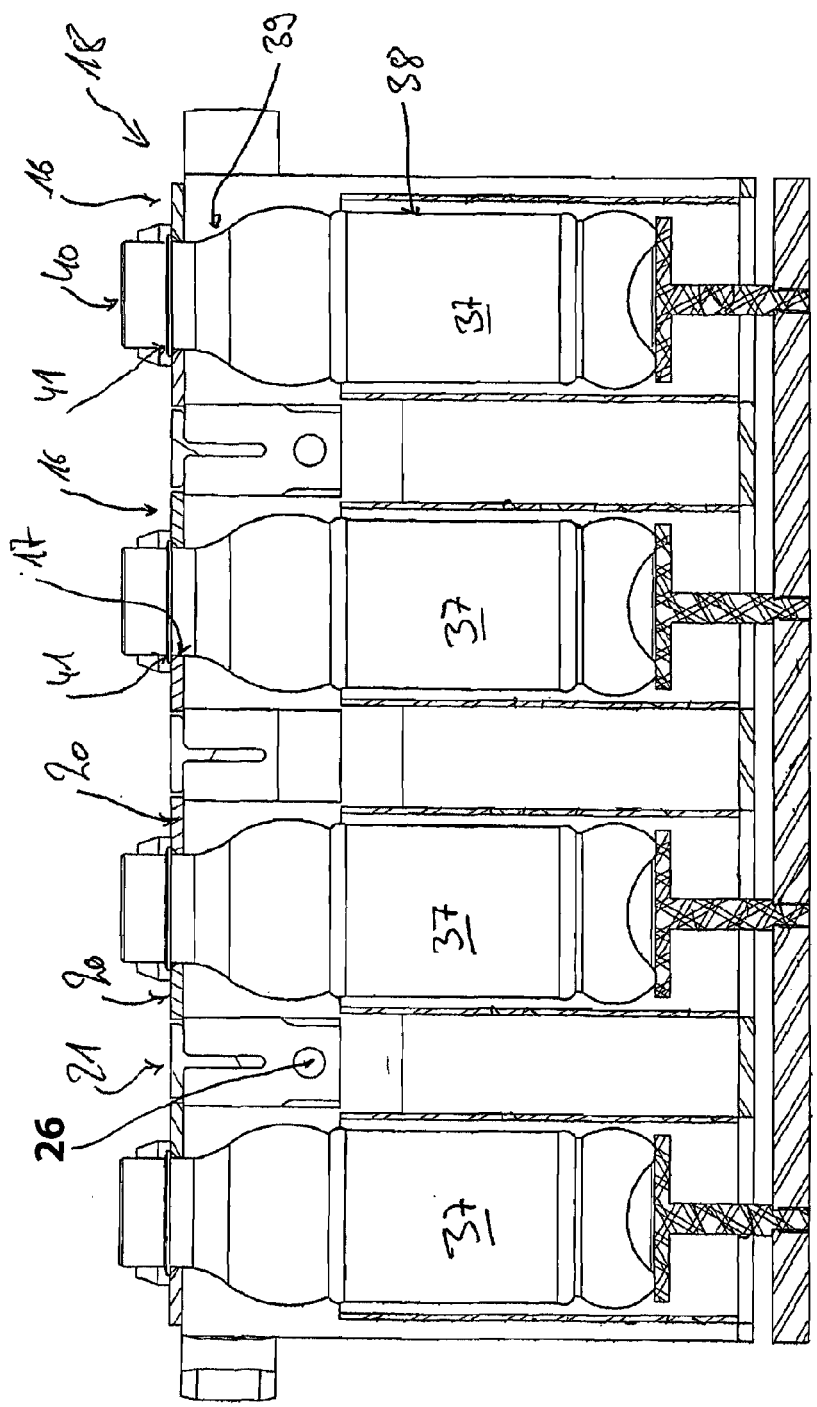
FIG. 14 illustrates a frame vertically cut parallel to the feed direction and equipped with containers.

The bottles 37 engaged in FIG. 14 in the support elements 16 of a frame 18 include a bottle element 38 which transitions into a bottle neck 39 through a taper of the bottle diameter. The bottle neck 39 is provided with a radially protruding bottle collar 41 proximal to the bottle opening 40. The bottles 37 are respectively inserted into a bottle receiver 17 with their bottle necks 39. Thus, the bottle element 38 is arranged below the support elements 16; the bottle collar 41 contacts the support element 16. For inserting the bottles into the bottle receiver 17 of the support elements 16 the invention proposes a novel container feed device which is designated with the reference numeral 50 in its entirety. This is subsequently described with reference to FIGS. 15-20.

Figure 15:
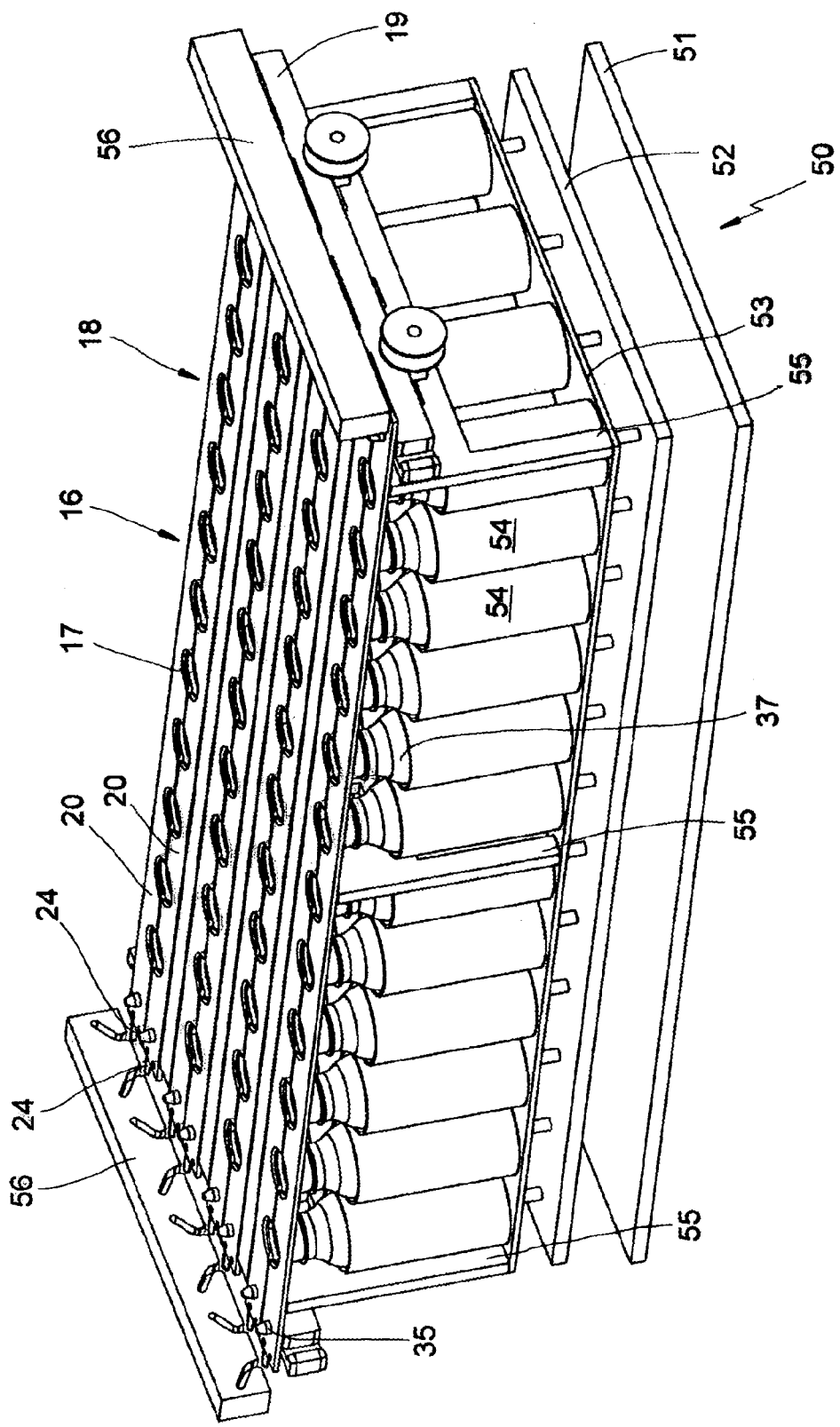
FIG. 15 illustrates an overview of a container feed device according to the invention.

FIG. 15 illustrates the container feed device 50 below a frame 18 provided with support elements 16. As illustrated in the figures the support elements 16 respectively include two support element halves 20 which are respectively provided with partial recesses. Corresponding partial recesses oriented towards one another in pairs jointly form a container receiver 17.

The container feed device 50 includes a base plate 51 above which a bottle lifting plate 52 is arranged. Above the bottle lifting plate 52 a bottle support 53 is arranged in turn. On the bottle support plate 53 sleeve shaped bottle supports 54 are applied corresponding to the number of container receivers 17. On the bottle support plate 53 furthermore support element lifting devices 55 are arranged. The bottles 37 to be inserted into the support elements 16 are arranged within the bottle holders 54. In the portion of the container feed device 50 the device 10 includes slotted link sliding blocks 56 which are arranged parallel to the longitudinal beams 19 of the frame 18 and above the support elements 16. The base plate 51, the bottle lifting plate 52 and the bottle support plate 53 are vertically moveable through a drive that is not illustrated, wherein all of the plates 51-53 are vertically moveable relative to one another.

Figure 16:
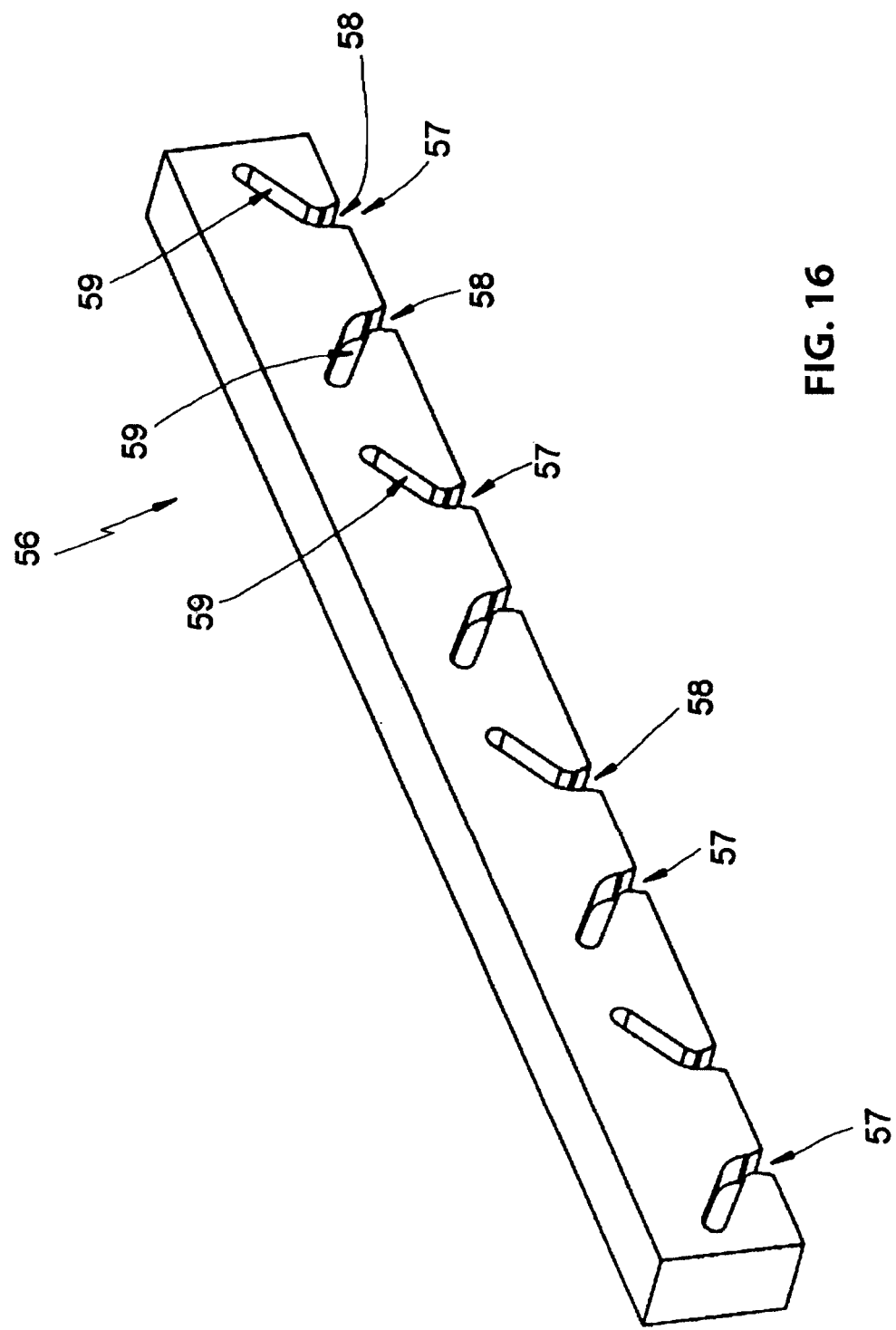
FIG. 16 illustrates a slotted link sliding block according to FIG. 15.

According to FIG. 16 each of the sliding blocks 56 includes a slotted link 57 support which includes a vertically oriented insertion section 58 for the support members 24 of the support element halves 20. Two respective adjacent slotted links 57 form a slotted link pair. The slanted sections 59 adjoining the vertical insertion section 58 of each slotted link pair are oriented opposite to one another. Therefore each slotted link pair includes slotted link guides 57 which are configured as mirror images relative to one another.

Figure 17:
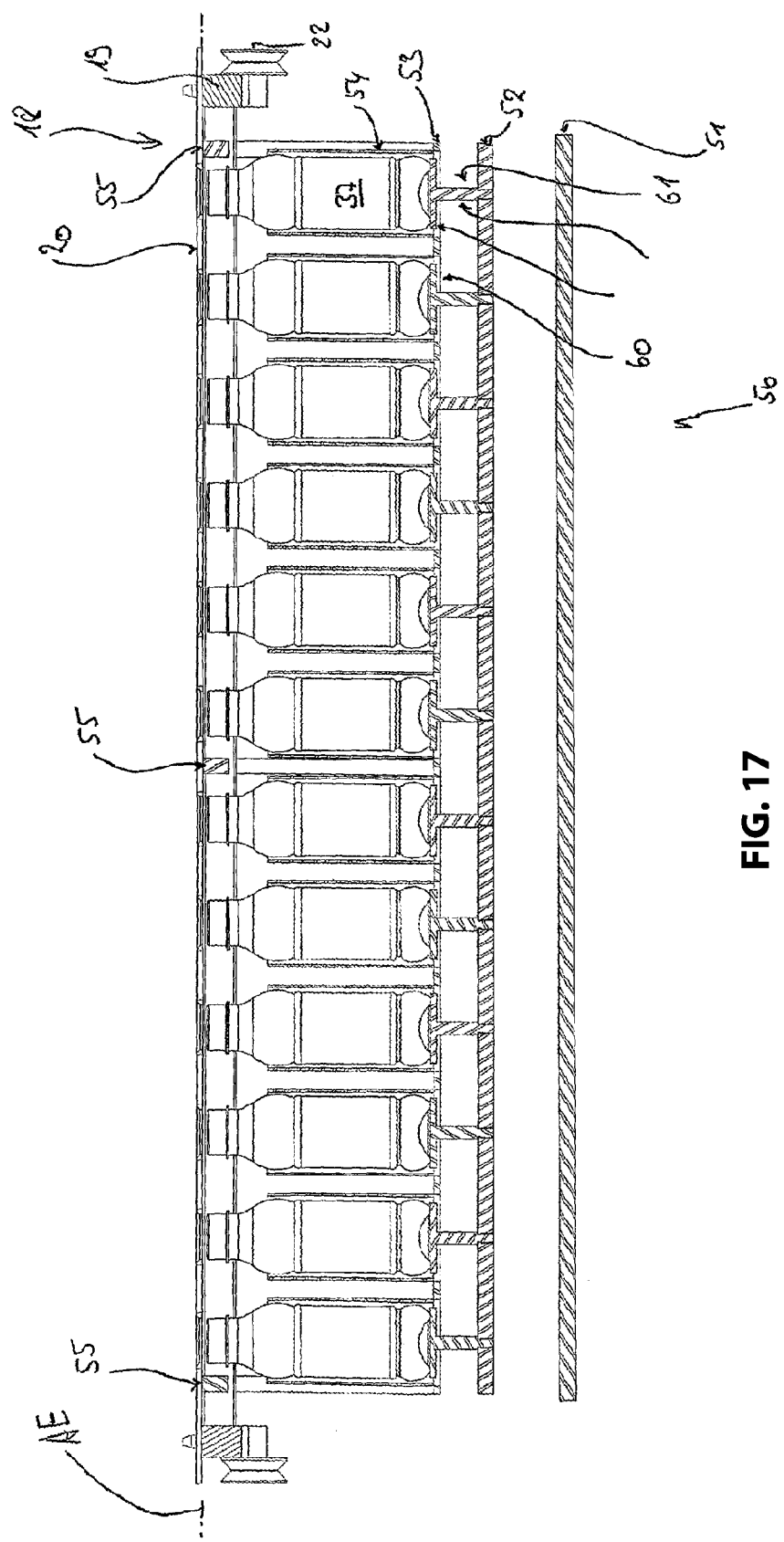
FIG. 17 illustrates a vertical sectional view of the container feed device according to FIG. 15 transversal to the feed device.

In FIG. 17 the container feed device 50 is illustrated in a vertical sectional view, wherein the cutting plane is arranged transversal to the feed direction. From this sectional view it is apparent that the bottle support plate 53 in the portion of each bottle support 54 includes a cutout 60. In each cutout 60 a bottle lifting device 61 arranged which is attached to the bottle lifting plate 52. The bottle lifting device 61 includes a vertically aligned bottle lifting support 62 that is attached at one end to the bottle lifting plate 52 and a bottle lifting plate 63 attached at another end to the bottle lifting support 62. The bottle 37 sits on the bottle lifting plate 63 with its bottle base.

The function of the container feed device 50 is now described with reference to FIGS. 17-20. In the portion of a container feeding which is arranged outside of the upper main element OT or the lower main element UT at the device the bottle supports 54 of the container feed device 50 are loaded with bottles 37. Then the container feed device is moved into the portion of the upper main element OT or the lower main element UT where the bottles 37 are inserted into the support elements 16. In the start position of the container feed device 50 illustrated in FIG. 17 the lifting devices 55 contact the bottom side of the support element halves 20. The bottle necks 39 are arranged below the support elements 16.

Figure 18:
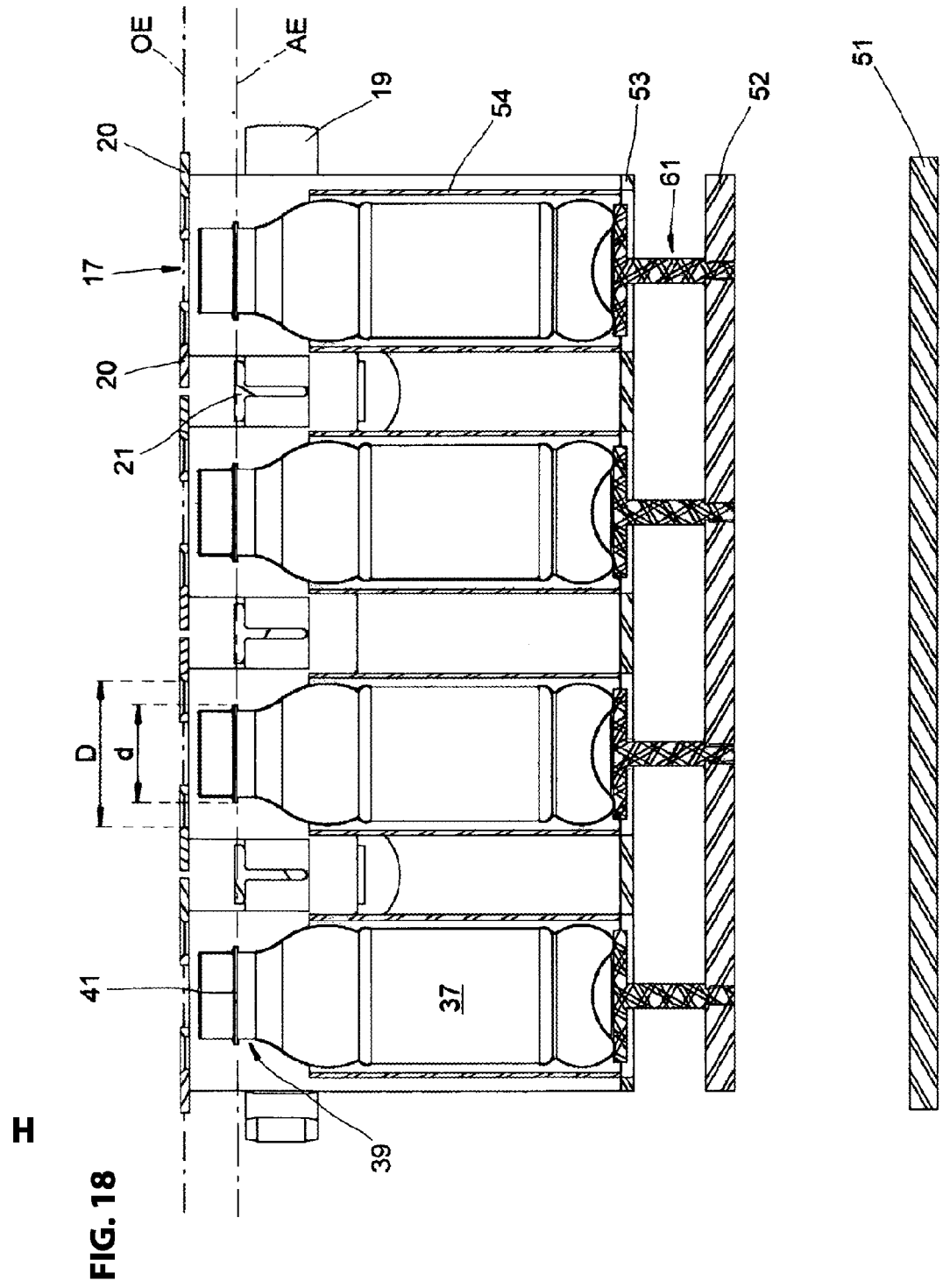
FIG. 18-20 illustrates a container feed device according to FIG. 15 in a vertical sectional view performed parallel to the feed device in different operating positions.
Figure 19:
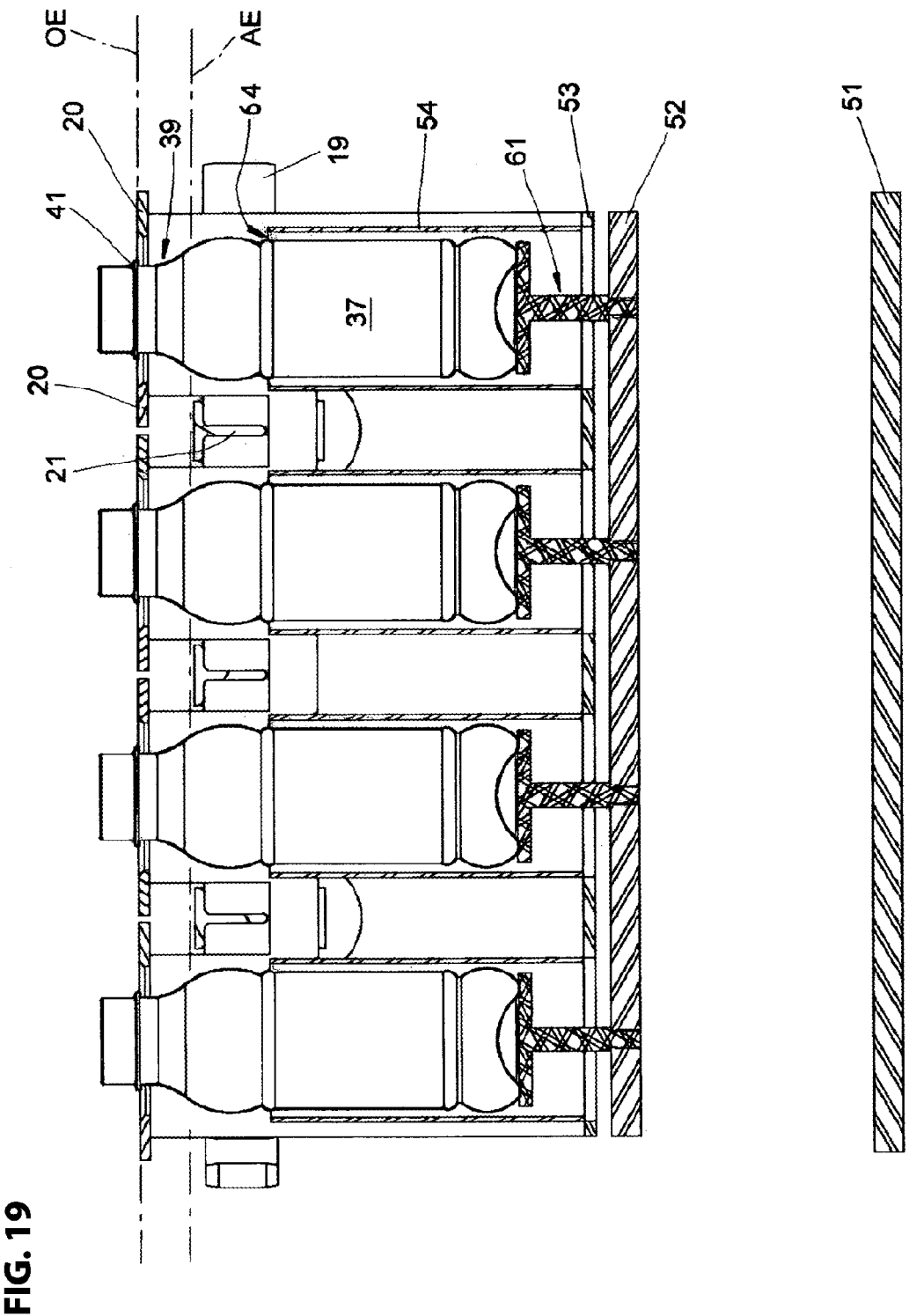
Figure 20:
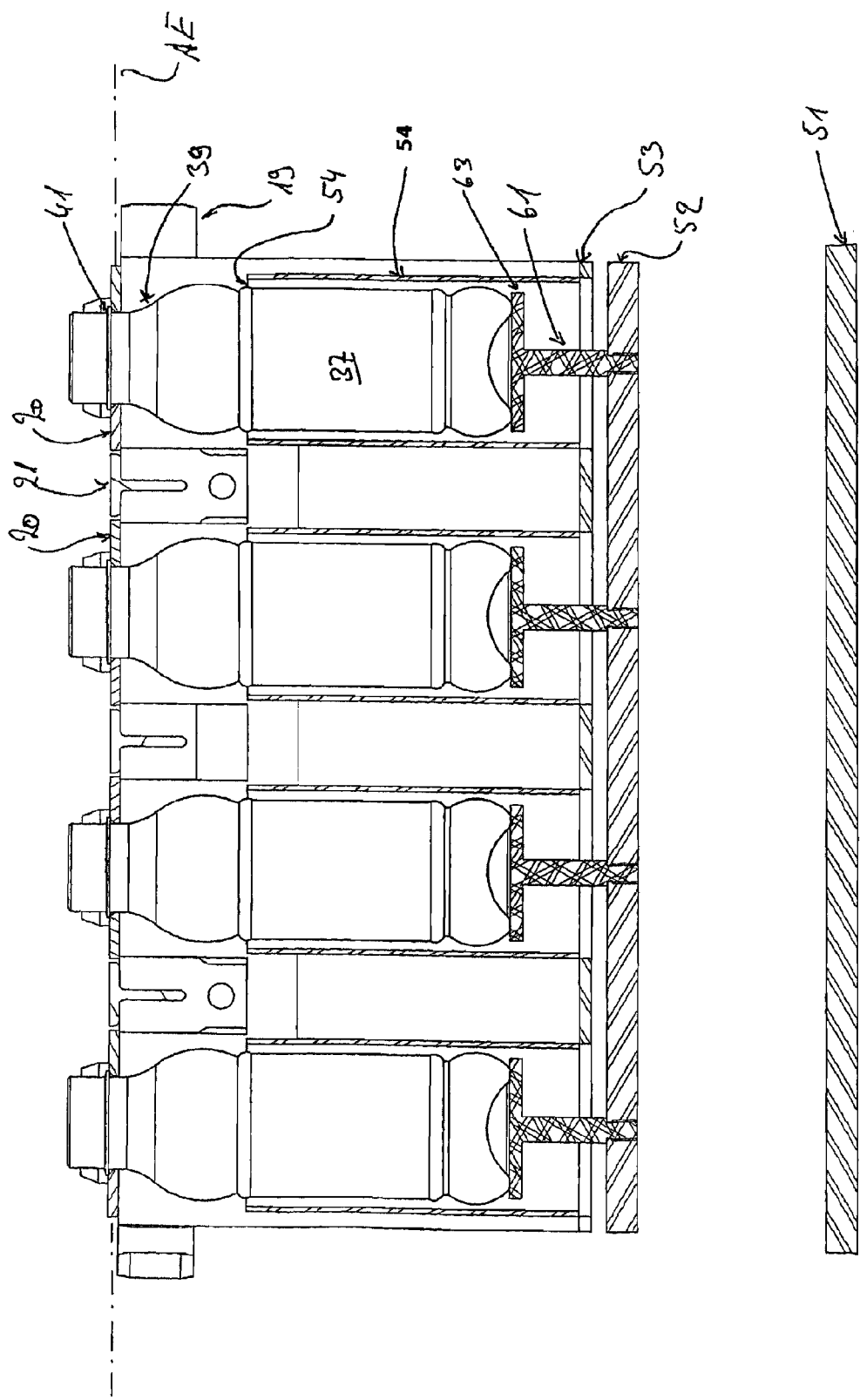

FIGS. 18-20 illustrate a vertical sectional view through a frame 18 and a container feed device 50 arranged there under, wherein the sectional plane is arranged parallel to the feed direction. Contrary to the starting position of the container feed device which is illustrated in FIG. 17 the opening position is illustrated in FIG. 18. The unit including the bottle lifting plate 52 and the bottle lifting plate 53 has been vertically raised relative to the base plate 51. The lifting devices 55 not illustrated in FIG. 18 consequently move the support elements 20 also in vertically upward direction. The support element halves 20 leave the operating portion of the pins 35. Simultaneously support members 24 engage the vertical insertion sections 58 of the slotted ink sliding blocks 56. Subsequently the support members 24 move into the slanted sections 59 of the slotted links 57 which transform the vertical movement of the support element halves 20 into a lateral movement. Consequently the support element halves 20 of a support element 16 are offset from one another which widens the container receivers 17. Thus, the support element halves 20 are moved from their contact plane A, E (the plane in which they contact the longitudinal beam 19) into the opening plane OE. Widening the container receivers 17 or the lateral movement of the support element half 20 controlled by the slotted links is evident in particular from their positions relative to the transversal profile 21. While the transversal profiles 21 are arranged in the sectional view of FIG. 13 between two support elements 16 the adjacent support element halves 20 of two support elements 16 cover the transversal profiles 21 when they are arranged in the opening plane OE.

It can be furthermore derived from FIG. 18 that the bottle necks 39 with their bottle collars 41 have a smaller diameter d than the widened container receivers 17 with its opening width D.

Through the joint vertical movement of bottle lifting plate 52 and the bottle support plate 53 the bottle necks 39 move into the contact plane AE. This provides that the bottle collars 41 are arranged above the contact plane AE. Overall the unit including bottle lifting plate 52 and bottle support plate 53 was moved in vertically upward direction by the distance between contact plane AE and the opening plane OE of the support elements halves 20.

FIG. 19 illustrates the bottle insertion position of the container feed device 50. As evident in comparison with FIG. 18 the bottle lifting plate 52 in order to reach this position was moved vertically upward relative to the bottle support plate 53. Through the bottle lifting devices 61 coupled with the bottle lifting plate 52 the bottles 37 are also moved vertically upward, wherein the bottle lifting devices 61 penetrate the bottle holders 54. Through the vertical movement of the bottle lifting plate 52 the bottle necks 39 are moved into the opening plane OE of the support element halves 20. Thus the bottle colors 41 are arranged above the support element halves 20.

FIG. 20 illustrates the closed position of the container feed device 50. The unit including bottle support plate 53 and bottle lifting plate 52 moves downward in its entirety relative to the base plate 51 in order to reach the closed position in FIG. 20. The support element halves 20 supported on the lifting devices 55 not illustrated herein follow the downward movement. Thus, the slotted link guide 57 in which the support members 54 are supported provides the closing movement of the support element halves 20 which is opposite to the opening movement. After the closing movement is completed the support element halves 20 are placed into the contact plane AE again. The lateral reverse movement of the support element halves 20 in turn is evident from the positions of the support element halves relative to transversal profiles 21. The transversal profiles 21 are now arranged at the same levels between the support element halves 20 of two adjacent support elements 16. The performed relative downward movement is evident from the comparison of FIGS. 19 and 20 and the distance between the upper opening 64 of the bottle supports 54 and the transversal profile 19.

After completion of the closing movement the bottle lifting plate 52 is lowered far enough so that the bottle lifting plates 63 are again arranged in the plane of the bottle support plate 53. Subsequently the container feed device 50 is lowered far enough so that the bottle supports 54 release the bottles 37.

It is evident that the container feed device 50 described supra is also useable as a container extraction device when the movement path is reversed. In this case FIG. 20 forms the starting position. The bottles 37 are inserted into the bottle holder 54. The bottle lifting device 61 already supports the bottle base. Differently from FIG. 19 the unit including bottle support plate 53 and bottle lifting plate 52 is moved vertically upward so that the lifting devices 55 not illustrated in FIG. 20 but contacting the bottom side the support element halves 20 move the support element halves in vertically upward direction. Due to the engagement of the support members 24 into the sliding link guides 57 a lateral movement of the support element halves 20 and thus an opening of the container receivers 17 is provided. Subsequently thereto and transitioning to FIG. 18 the bottle lifting plate 52 moves downward relative to the bottle support plate 53. The bottles are consequently lowered relative to the support element halves 20. A subsequent movement of bottle lifting plate 52 and bottle support plate 53 by the same amount downward relative to the base plate 51 also moves the lifting devices 55 downward which are not illustrated in FIG. 18. After the movement of the lifting device the support element halves 20 follow and thereafter the support element halves which are guided by the slotted link guides 57 close again. After the closing movement the container extraction device is in the position illustrated in FIG. 17 relative to the frame 18, wherein the position was described therein as a starting position of the container feed device 50. In order to complete the extraction process the container extraction device now has to leave the extraction location in the upper or lower main element. The bottles are removed from the bottle supports 54 by another device that is not described in more detail and the bottles are assembled into interconnections for subsequent transportation.

In summary initially a solution was presented in which the support elements 17 for the containers 37 which are run on rollers 22 through the support device 10 can be centered transversal to the feed direction. The centering is configured in a particularly simple manner through a form locking engagement of the roller 22 and the running rail 27.

Furthermore a frame 18 was presented on which the support elements 16 are moveable through the device 10 wherein the support elements are arranged in groups. This is a considerable improvement with respect to the alignment of the support elements 16 in feed direction since the support elements 16 are pushed through the device 10, support element 16 adjacent to support element 16, which substantially reduces the possible summation error through contaminations between the support elements 16. Furthermore frames 18 according to the invention facilitate a coupling to one another which facilitates a controlled acceleration and deceleration.

Eventually a new container feed device 50 is disclosed which is also suitable to be used as a container extraction device. It is an essential advantage of the container feed device 50 to reduce the opening travel of the support element halves 20 due to the container feed to the support element 16 from below. Consequently directly adjacent support elements 16 can be simultaneously fed with containers 37. Furthermore it is possible compared to the double step machines known from the prior art to provide more than two support elements 16 simultaneously with containers 37 while only requiring acceptable installation space. Consequently the throughput and also the cost effectiveness of a filling device 10 can be substantially increased.

REFERENCE NUMERALS AND DESIGNATIONS

10 device
11 operating station
12 sterilization- and drying unit
13 dosing station
14 cap placement station
15 cap screwing station
16 support elements
17 container receivers
18 frames
19 longitudinal profiles of 18
20 support element halves
21 transversal profile of 18
22 rollers of 18
23 connection elements of 19
24 support members
25 support rail
26 roller axis
27 running bar
28 V-shaped or roof shaped groove of 22
29 running surface of 22
30 running surface of 27
31 groove
32 groove side wall of 31
33 coupling member
34 side lobes of 33
35 pin
36 bore hole
37 bottle
38 bottle element
39 bottle neck
40 bottle opening
41 bottle collar
50 container feed device
51 base plate
52 bottle lifting plate
53 bottle support plate
54 bottle support
55 lifting device
56 slotted link sliding blocks
57 slotted link guide
58 vertical insertion section of 57
59 slanted section
60 cut out of 53
61 bottle lifting device
62 bottle lifting device support
63 bottle lifting device plate
64 upper opening of 54
AE contact plane
OE opening plane
OT upper main element
UT lower main element
ST lateral element
R series of container receivers 17 of a support element 16
B tracks of container receiver 17
X movement direction of the support elements in upper main element
Y movement direction of the support elements in the lower main element

What is claimed is:

1. A device for filling containers with food products, comprising:
an upper main element, a lower main element and lateral elements connecting the upper main element and the lower main element; and
a plurality of adjacent support elements,
wherein at least two adjacent support elements are arranged respectively on common respective frames,
wherein each of the support elements includes plural receivers for containers which receivers are arranged in rows transversal to a feed direction of the frames,
wherein the frames are respectively supported on rollers mounted to the frames and the frames are run through the device in an endless manner past operating stations along the upper main element, the lateral element and the lower main element,
wherein the frames with the support elements are driven through the device by a chainless drive.

2. The device according to claim 1, wherein the rollers are arranged at the common respective frames of the at least two support elements and the frames are run by the rollers on running tracks through the device.

3. The device according to claim 1, wherein the frames are connected with one another through connection elements at least during a movement of the support elements along the operating stations.

4. The device according to claim 3, wherein the connection of the frames with one another, besides the required fit clearance between the connection elements, is without clearance.

5. The device according to claim 1, wherein four support elements are arranged on a common frame.

6. The device according to claim 1,
wherein the support elements along a row are split in halves so that each support element half includes partial cut outs and so that partial cut outs oriented towards one another of adjacent support element halves jointly form a receiver for containers,
wherein the support elements are arranged vertically liftable in a linear manner on the common frame and are laterally moveable in a linear manner in a raised position for opening the receivers for inserting the containers.

7. A device for filling containers, comprising:
an upper main element;
a lower main element and lateral elements connecting the upper main element and the lower main element;
and a plurality of support elements which are supported on rollers through the device in an endless manner past operating stations along the upper main element, the lateral element and the lower main element,
wherein the support elements include receivers for containers which receivers are arranged in rows transversal to a feed direction,
wherein at least two support elements are arranged respectively on common respective frames and are run by the frames on rollers through the device in an endless manner,
wherein the frames are connected with one another through connection elements at least during a movement of the support elements along the operating stations, wherein the connection elements arrange the frames at one another in horizontal direction, but a vertical movement of two adjacent frames relative to one another disengages the connection.

8. A device for filling containers, comprising:

an upper main element;

a lower main element and lateral elements connecting the upper main element and the lower main element;

and a plurality of support elements which are supported on rollers through the device in an endless manner past operating stations along the upper main element, the lateral element and the lower main element, wherein the support elements include receivers for containers which receivers are arranged in rows transversal to a feed direction, wherein at least two support elements are arranged respectively on common respective frames and are run by the frames on rollers through the device in an endless manner, wherein the frames are connected with one another through connection elements at least during a movement of the support elements along the operating stations, wherein the connection elements respectively include a groove with concave side walls and a respective coupling member, wherein the coupling member of a first connection element is inserted without clearance into the groove of a second connection element between apex lines of the concave groove side walls.

9. A device for filling containers, comprising:

an upper main element;

a lower main element and lateral elements connecting the upper main element and the lower main element;

and a plurality of support elements which are supported on rollers through the device in an endless manner past operating stations along the upper main element, the lateral element and the lower main element, wherein the support elements include receivers for containers which receivers are arranged in rows transversal to a feed direction, wherein at least two support elements are arranged respectively on common respective frames and are run by the frames on rollers through the device in an endless manner, wherein the frames are connected with one another through connection elements at least during a movement of the support elements along the operating stations, wherein the coupling member includes convex side lobes arranged in parallel with the groove side walls, wherein an approximately level arrangement of the apex lines of the concave groove side walls and the convex coupling member side lobes of intermeshing connection elements provides a connection of the frames with one another that has essentially no clearance.

* * * * *